US006956671B2

(12) United States Patent
Monty et al.

(10) Patent No.: US 6,956,671 B2
(45) Date of Patent: Oct. 18, 2005

(54) SPECIFYING IMAGE FILE PROCESSING OPERATIONS VIA DEVICE CONTROLS AND A USER-COMPLETED PROOF SHEET

(75) Inventors: Melissa Monty, San Diego, CA (US); Steven T. Breidenbach, San Diego, CA (US); Kirt A Winter, San Diego, CA (US); John Mark Hatcher, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 954 days.

(21) Appl. No.: 09/767,935

(22) Filed: Jan. 23, 2001

(65) Prior Publication Data

US 2001/0019416 A1 Sep. 6, 2001

Related U.S. Application Data

(63) Continuation-in-part of application No. 09/735,090, filed on Dec. 12, 2000, which is a continuation-in-part of application No. 09/173,050, filed on Oct. 15, 1998.

(51) Int. Cl.$^7$ .............................................. G06F 15/00
(52) U.S. Cl. .................... 358/1.9; 358/1.15; 358/487; 355/40
(58) Field of Search ...................... 358/1.9, 1.1, 1.13, 358/1.14, 1.15, 1.16, 1.18, 487, 407; 355/40, 41

(56) References Cited

U.S. PATENT DOCUMENTS

| | | | |
|---|---|---|---|
| 4,441,807 A | 4/1984 | Bartz | |
| 4,489,351 A | 12/1984 | d'Alayer de Costemor | |
| 4,827,347 A | 5/1989 | Bell | |
| 4,965,662 A | 10/1990 | Shiota | |
| 5,124,742 A | * 6/1992 | Yoshikawa | ................... 355/27 |
| 5,359,387 A | * 10/1994 | Hicks | .......................... 355/40 |
| 5,426,481 A | * 6/1995 | Slater et al. | ................. 396/661 |
| 5,447,827 A | 9/1995 | Ishikawa et al. | |
| 5,563,722 A | 10/1996 | Norris | |
| 5,666,215 A | 9/1997 | Fredlund et al. | |
| 5,706,097 A | 1/1998 | Schelling et al. | |
| 5,748,248 A | 5/1998 | Parke | |
| 5,768,444 A | 6/1998 | Nishimura | |
| 5,838,458 A | 11/1998 | Tsai | |
| 6,141,111 A | * 10/2000 | Kato | .......................... 358/1.15 |
| 6,151,098 A | * 11/2000 | Kayama | ...................... 355/29 |
| 6,157,436 A | * 12/2000 | Cok | .............................. 355/40 |
| 6,434,579 B1 | 8/2002 | Shaffer et al. | |
| 6,623,528 B1 | 9/2003 | Squilla et al. | |

OTHER PUBLICATIONS

Press Release, Mar. 22, 1999 "Compaq Goes All–In–One With New A900 for Printing, Faxing, Color Copying and Scanning".
Compaq A1000 All–In–One User Guide, 1999.
Compaq A900 All–In–One User Guide, 1998.

\* cited by examiner

*Primary Examiner*—Mark Wallerson

(57) ABSTRACT

A multifunction printing system, and a method for processing image files, which allows a sequence of multiple image processing operations on digital image files, such as photographs taken by a digital camera, to be specified and initiated at a single point in time. The system includes a command interface through which default values for image processing parameters can be set and an initial image processing operation initiated. The system also includes a scanner for receiving a combination proof sheet and order form. Prior to scanning, the proof sheet is marked by the user to identify the image files to be processed, any overriding image processing parameter values for some or all of the images, and any additional image processing operations to be performed. Image processing operations include printing image files, storing image files on a mass storage device, and sending image files via fax or e-mail.

27 Claims, 30 Drawing Sheets

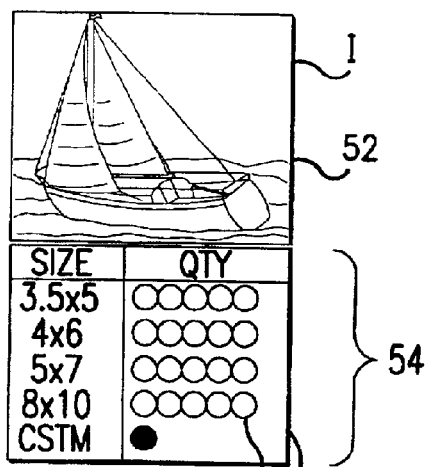
FIG.3B
FIG.3C
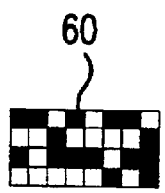
FIG.3D
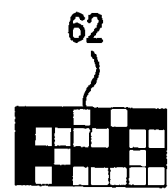
FIG.3F

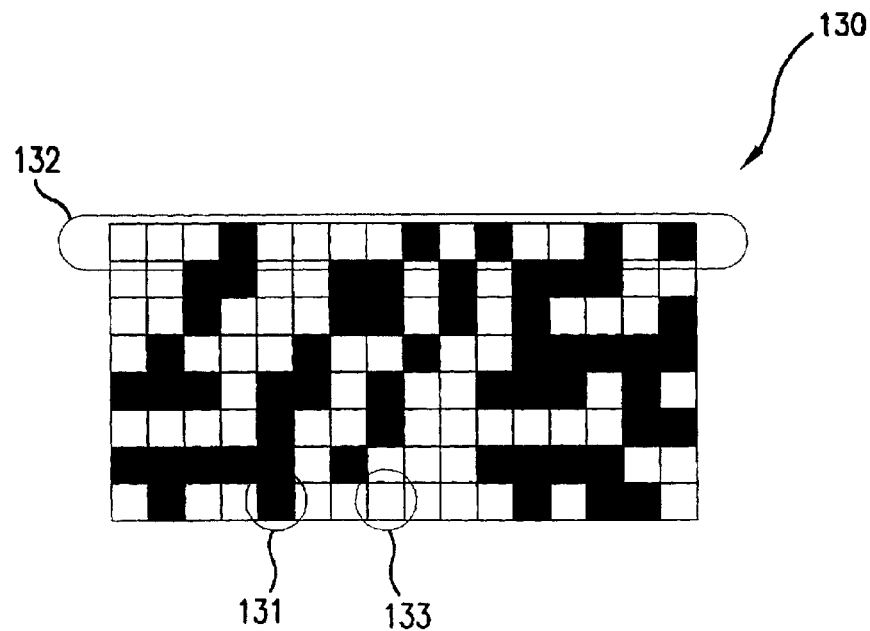

n-BIT DATA KEY

SPECIFYING IMAGE FILE PROCESSING OPERATIONS VIA DEVICE CONTROLS AND A USER-COMPLETED PROOF SHEET

CROSS-REFERENCE TO RELATED APPLICATIONS

This application is a continuation-in-part of the co-pending U.S. application Ser. No. 09/735,090, by Winter et al., filed Dec. 12, 2000, titled "Storing and Retrieving Digital Camera Images Via a User-Completed Proof Sheet" which is a continuation-in-part of the co-pending U.S. application Ser. No. 09/173,050, by Winter et al., filed Oct. 15, 1998, titled "System and Method For Printing and Scanning a User-Completed Digital Still Camera Image Proof Sheet and Order Form". This application is assigned to the assignee of the present invention and is hereby incorporated by reference in its entirety.

FIELD OF THE INVENTION

The present invention relates generally to digital image processing, and more particularly to a system and method for a user to specify image processing operations and parameters, and the particular images to which they apply, via device controls and a user-completed proof sheet.

BACKGROUND OF THE INVENTION

Digital still cameras (DSCs) are rapidly gaining popularity with consumers. They permit high resolution color images to be stored for subsequent printing by conventional ink jet and laser printers. The quality of the color prints that are produced approaches that of conventional silver halide photographic prints. More importantly, the digital images can be permanently stored on different forms of media such as compact disks (CDs), manipulated and altered in a personal computer (PC), inserted into computer graphics and word processing programs, sent to friends and relatives via e-mail, and transmitted over the Internet as part of web pages. From an environmental standpoint digital still cameras are attractive because they eliminate the need for chemical developer solutions.

Commercially available digital still cameras typically have a removable data storage media such as floppy diskette or a flash memory card onto which the digital representation of the images captured by the camera optics and charge coupled device (CCD) can be stored. These forms of media may be removed and plugged into a personal computer so that the digital representations of the images may be viewed. The personal computers may be provided with digital still camera image processing software for enhancing the color balance, contrast, borders and other characteristics of the images prior to storage, printing or transmission. Typically the image processing software that runs on the personal computer allows certain images to be selected and others discarded or ignored.

Other digital still cameras have been developed that may be coupled directly to a printer. These cameras are desirable for consumers who do not own personal computers or feel uncomfortable using such computers. The command buttons and graphical user interface (GUI) menus on such a camera's liquid crystal display (LCD) are used in accordance with a pre-programmed protocol to select the images to be printed. This type of digital still camera image selection and printing system has the advantage of not requiring a personal computer. It is normally undesirable to print all images, because some are usually poor in quality, and printing all images results in wasted time, paper and ink or laser toner. However, the user is faced with a complex and bewildering set of commands for selecting, downloading and printing images. As an alternative, the printer itself can be provided with a user interface for selecting images from a digital still camera. However this is undesirable because the printer ends up having user-unfriendly interface software. With either approach for coupling a digital still camera directly to a printer, without a PC interface, it is very tedious and cumbersome to vary the characteristics of the selected images to be printed, such as size, brightness, cropping, etc. For the sake of simplicity, such characteristics, along with others, are generally referred to herein as something that will "enhance" the original image taken by the digital still camera.

Users frequently wish to process some of the digital images differently than from others of the digital images. For example, for most of the images he or she may wish to print a certain number of copies of a certain print size, but for a few images print a different number of copies or make different size prints. In addition, users may wish to perform different processing operations on different images. For example, he or she may wish to print certain images on the local printer, but send other images via e-mail or fax to someone in a different location, and store yet other images on a mass storage system for retrieval at a future time.

It would therefore be desirable to provide a system and method for allowing a user to easily specify, at one point in time, the image processing operations to be performed, and the image processing parameters to be used, for different ones of a set of digital images, without requiring complex, repetitive, or on-going user interactions with the processing system.

SUMMARY OF THE INVENTION

In one preferred embodiment, the present invention provides a method for processing image files which allows a sequence of multiple image processing operations to be specified and initiated at a single point in time. In response to detecting a command to perform an initial image processing operation, a document is optically scanned to form a document image. The command may be the manipulation of a control on a multifunction printing system, or the receiving of a command sent to the printing system over a link from a host computer. The scanned document image is analyzed to detect control information, such as an identity marker, on the document. If the control information is present, it indicates that the document is a proof sheet containing markings by the user in user-designation areas which select the image files to be processed and may also specify additional image processing operations. Therefore, if the control information is present, the initial processing operation is performed on the user-selected image files. The method also analyzes the document image to detect whether any additional image processing operations are marked on the document; if so, those marked operations are performed on the user-selected image files. Image processing operations may include printing the image files on a medium, storing the image files on a mass storage device, and sending the image files to a compatible system of a recipient via e-mail, fax, posting onto a web page, or a similar method.

In another preferred embodiment, the present invention provides a method for specifying operational values for image processing parameters to be used with individual ones of a set of image files. The image files to be processed are identified, and default values for each of the parameters are obtained from a first data source, preferably the user-operated controls of a multifunction printing system having a scanner. For one or more subsets of the image files, overriding values for certain selected parameters are obtained from a second data source, preferably user markings made on a proof sheet inserted into the scanner. The image files in each subset are processed using the overriding values for the selected the parameters and the default values for the non-selected parameters. Image files which are not included in any of the subsets are processed using the default values for each of the parameters. Each subset preferably contains a single image file. The overriding values, and the parameters to which they apply, can be different for each subset. Examples of the image processing parameters include the copy-count or quantity of prints, the size or scaling of the image file, a media-select or tray-select parameter, an image brightness parameter, and a color balance parameter.

The inventive methods are preferably performed using a multifunction printer according to the present invention. The printer includes a processor, and has an input port connected to the processor for receiving the image files. An interface, such as a set of user interface controls and a communications port, connected to the processor receives a command which initiates a processing sequence and specifies an initial image processing operation to be performed on the image files by the processor during the processing sequence. The interface may also receive default values for a set of image processing parameters. The printer also includes a scanner connected to the processor for receiving and optically scanning a combination proof and order sheet specifying a user-marked operation to be performed on selected digital image files by the processor during the processing sequence. The sheet may also specify overriding values for selected image processing parameters, for at least one subset of the image files. The processor then processes each of the image files in each individual subset using the overriding values for the selected parameters and the default values for the non-selected parameters.

BRIEF DESCRIPTION OF THE DRAWINGS

The above-mentioned features of the present invention and the manner of attaining them, and the invention itself, will be best understood by reference to the following detailed description of the preferred embodiment of the invention, taken in conjunction with the accompanying drawings, wherein:

FIGS. 3A–3F illustrate a combination proof sheet and order form that may be utilized with the system of FIG. 1 to select one or more of an array of thumbnail images for final printing;

FIGS. 9A–9C are illustrative examples of alternative representations of an identity marker printed on the user-designation proof sheet of FIG. 8;

DESCRIPTION OF THE PREFERRED EMBODIMENT

Figure 1:
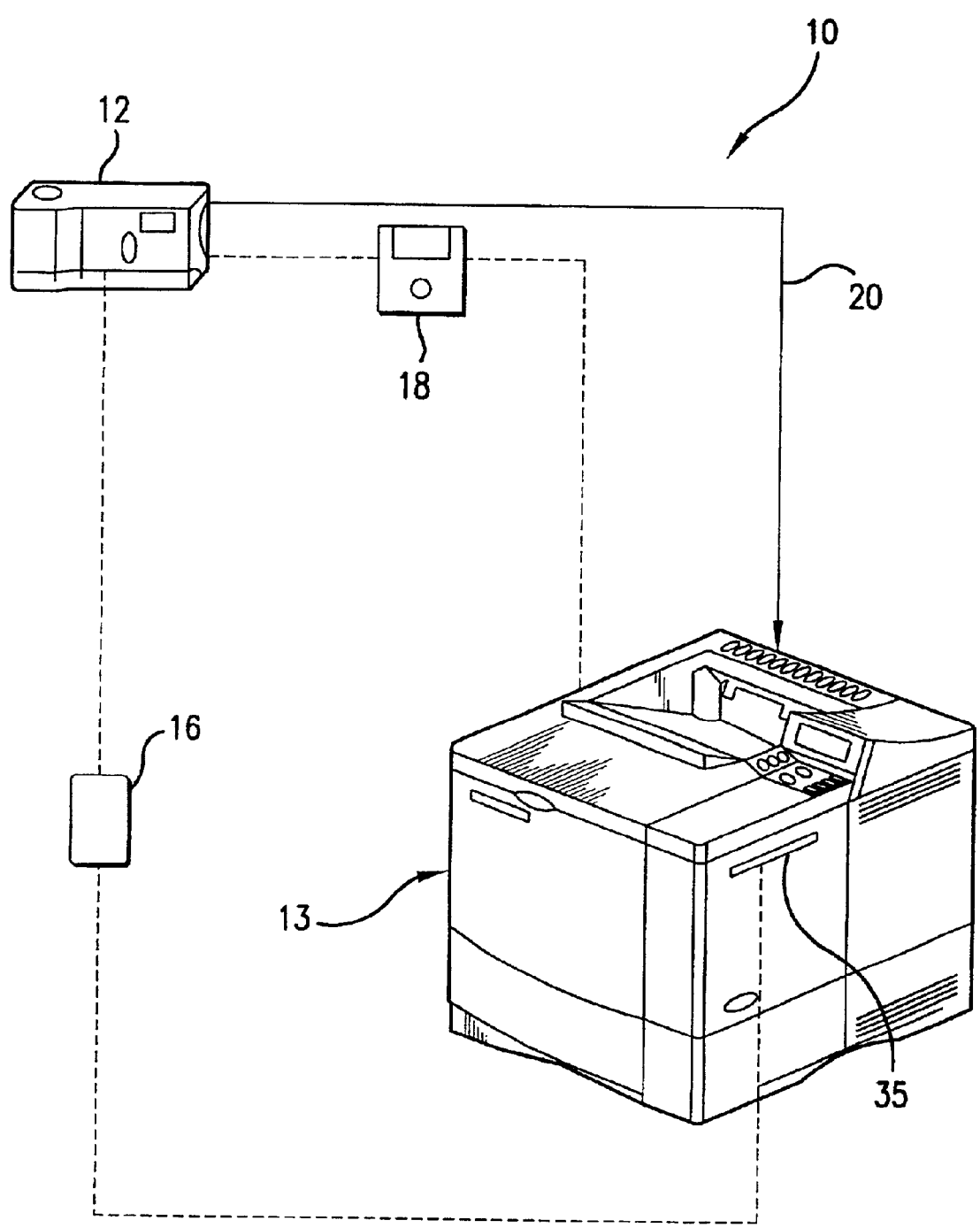
FIG. 1 is a diagrammatic illustration of a system for enabling a user to select and print digitally stored images in accordance with a preferred embodiment of the present invention.

Referring to FIG. 1, in accordance with the present invention a system 10 is provided for enabling a user to select and print digitally stored images. A conventional digital still camera 12 is used for taking and storing digital representations of a plurality of images. A laser printer 13 is used for generating graphical representations of selected ones of the plurality of images on a preselected print media. A flash memory card 16, floppy diskette 18, direct data link 20, wireless data link (not illustrated) or some other well known digital data transfer scheme is used to transfer the digital representations of the plurality of images from the digital still camera 12 to the laser printer 13.

Figure 3A:
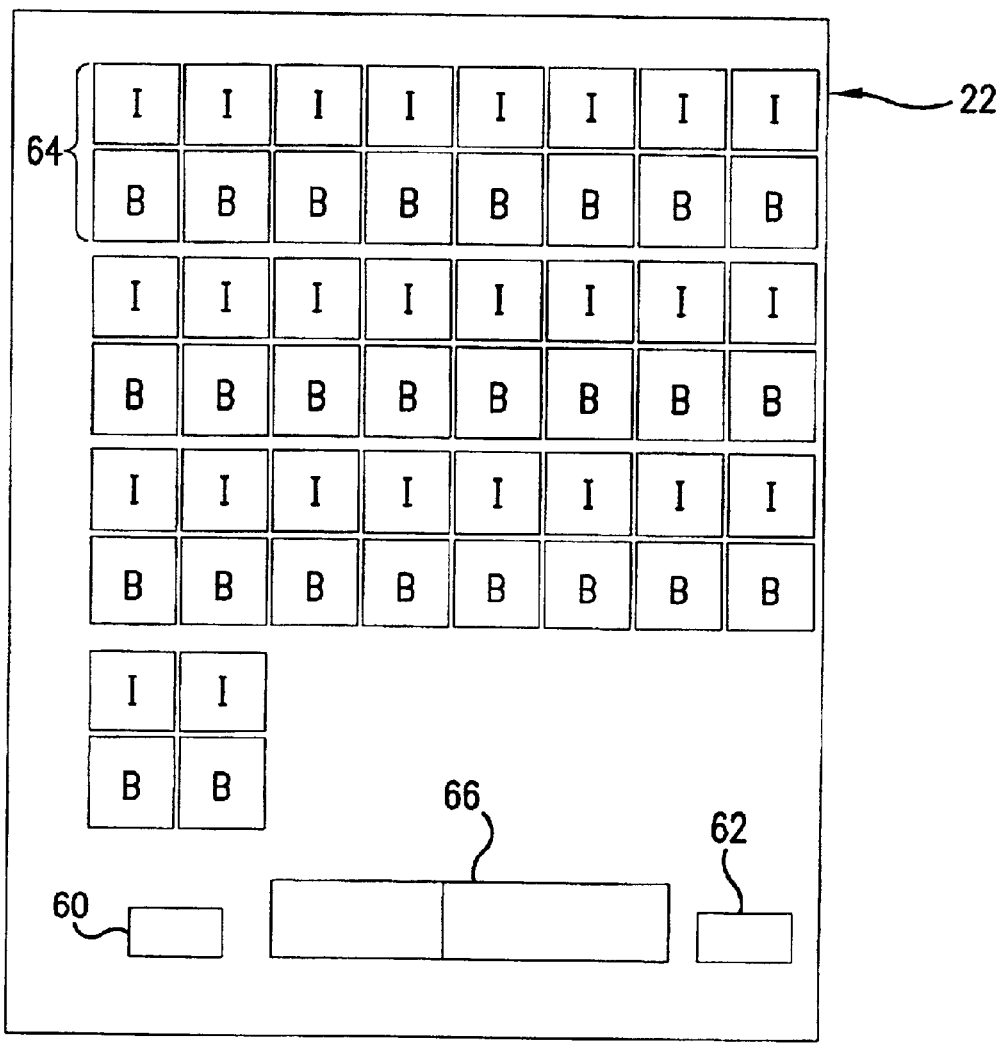

The laser printer 13 includes firmware programming for generating a combination proof sheet and order form 22 (FIG. 3A). As will be described later on in great detail, the combination proof sheet and order form 22 includes a graphical representation of at least one of the images and a plurality of image selection and/or image enhancement user designation areas.

It should be understood that the system of FIG. 1 can be used with an ink jet printer instead of a laser printer. Other types of printers could be utilized such as a dot matrix printer, dye sublimation printer, or thermal printer, provided they are capable of coloration and pixel density that will produce a suitable quality image. All that is necessary is that the printer have the electromechanical features, circuitry and firmware required to perform the functions described hereafter.

Figure 2:
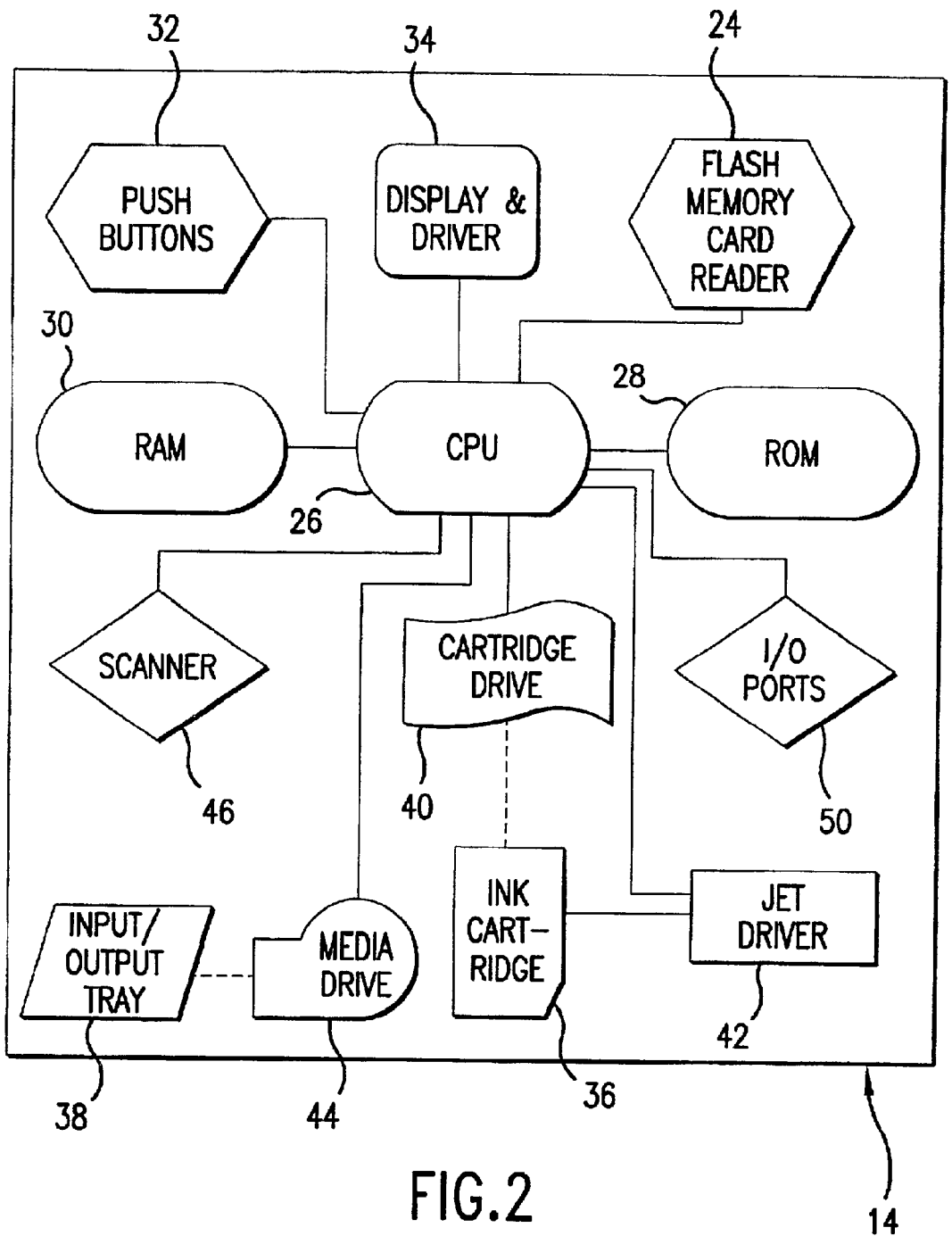
FIG. 2 is a functional block diagram of a printer that may be used in the system of FIG. 1.

FIG. 2 illustrates an ink jet printer 14, in functional block diagram form, that may be utilized in the system 10 of FIG. 1 in place of the laser printer 13. The ink jet printer 14 includes, for example, a reader 24 into which the flash memory card 16 may be removably inserted. Alternatively, the ink jet printer 14 could be equipped with a floppy disk drive or a wireless data transceiver. The flash memory card reader 24 is connected to a central processing unit (CPU) 26 which uses programs stored in a read only memory (ROM) 28 to download the digital representations of the images into a random access memory (RAM) 30. Pushbuttons 32 are manually selectively depressed by the user in a protocol directed by alphanumeric prompts, icons and/or other GUI indicated on an LCD display 34 and associated driver circuitry to cause the printer 14 to generate the combination proof sheet and order form 22 (FIG. 3A). In FIG. 1, the laser printer 13 has a slot or bezel 35 which allows insertion of the flash memory card 16 into a flash memory card reader.

An ink jet cartridge 36 (FIG. 2) is transversely reciprocated back and forth in the ink jet printer 14 while a sheet of print media such as plain paper located in an input/output media tray 38 is longitudinally advanced through the ink jet printer 14. An electro-mechanical cartridge drive mechanism 40 is controlled by the CPU 26 for moving the ink jet cartridge 36 transversely across the paper as required. The CPU 26 controls the ink jet cartridge 36 through a jet driver circuit 42. An electromechanical media drive mechanism 44 is connected to the CPU 26 for advancing the sheet of paper longitudinally through the ink jet printer 14.

The user manually completes selected user designation areas on the proof sheet and order form 22 (FIG. 3A), such as by marking thereon with a marking implement such as a pencil or a pen. This permits the user to select which images to send to final printing, image quantity, image brightness, image cropping, etc. The completed proof sheet and order form 22 is then manually re-inserted into the input/output media tray 38 (FIG. 2) of the ink jet printer 14. The user then pushes one or more of the push buttons 32 on the ink jet printer 14 to cause the media drive mechanism 44 to draw the now-completed form 22 from the tray 38 back through the ink jet printer 14. Alternatively, the printer 14 can detect the re-insertion of the order form 22 and automatically start printing the final print sheet(s).

Figure 5:
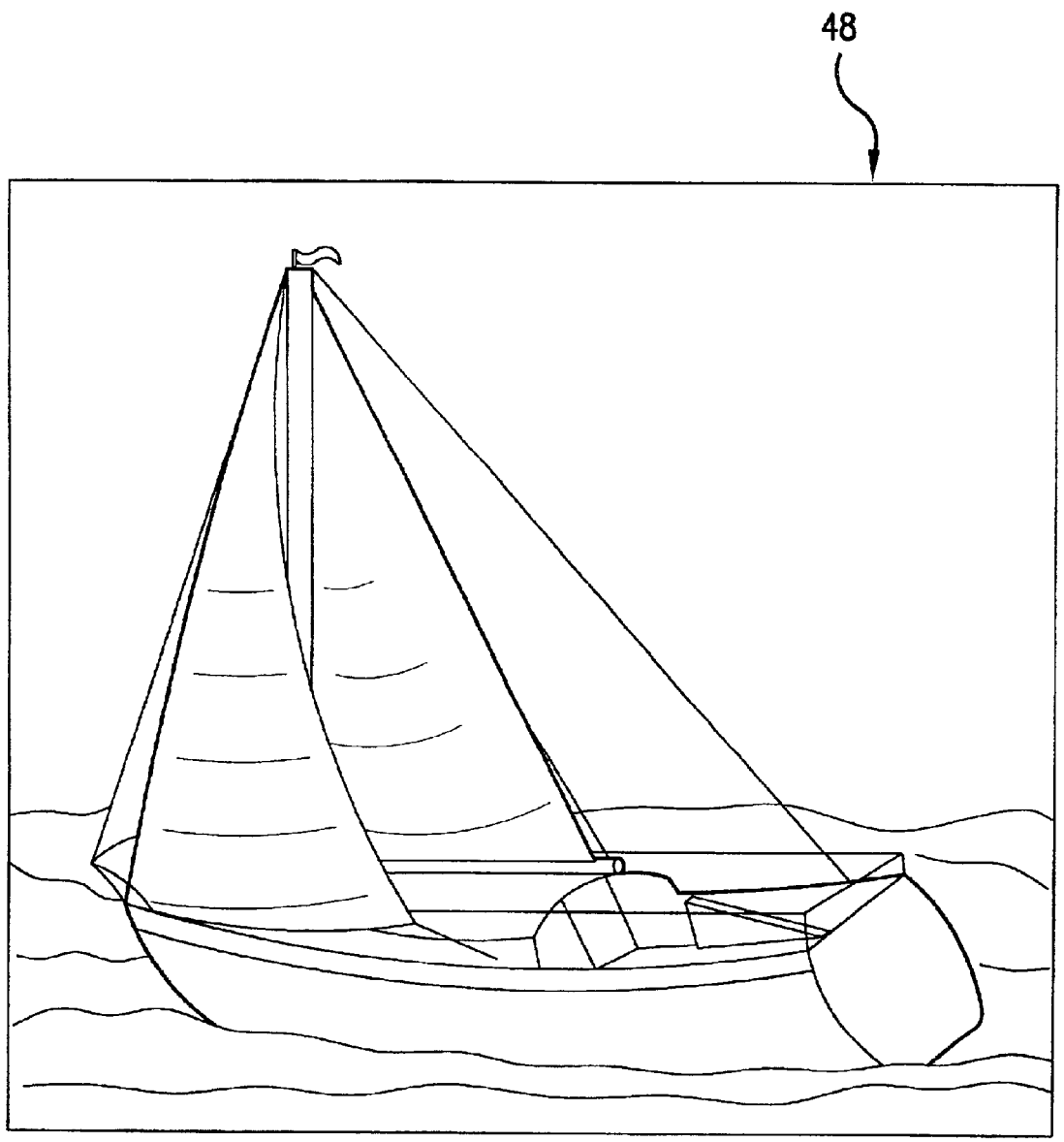
FIG. 5 illustrates an exemplary final print sheet with an image having the size, brightness and cropping designated by the user on the custom proof sheet and order form of FIG. 4.

A scanner 46 (FIG. 2) including circuitry and software is mounted in the ink jet printer 14. The scanner 46 may, for example, include a high intensity illumination source (not illustrated) and an array of photo detectors (not illustrated) mounted adjacent the path of the proof sheet and order form 22 as it is conveyed longitudinally through the ink jet printer 14. Alternatively, the scanner 46 can incorporate the exiting paper edge sensors that are already in some printer. Some ink jet printers have sensors for detecting the type of media and the activation energy for the ink jet pen. These sensors can be used to detect completed user designation areas. The scanner 46 is used to detect the user designation areas completed by the user on the proof sheet and order form 22. This information is conveyed to the CPU 26 for storage in the RAM 30. Programming stored in the ROM 28 is used by the CPU 26 to generate at least one final print sheet 48 (FIG. 5). As discussed hereafter in detail, the final print sheet or sheets have the images and enhancements (e.g. size, cropping, brightness, etc.) designated by the user on the combination proof sheet and order form 22.

The inkjet printer 14 (FIG. 2) is also provided with a plurality of input/output (I/O) ports 50 for connecting cables such as the direct data link 20 to the digital still camera 12 (FIG. 1) and to a personal computer (not illustrated). The ink jet printer could have a wireless data transceiver for communicating with the digital still camera, such as an infrared based system widely used with 8 mm VCR cameras to communicate with their remote controls.

FIG. 3A is a detailed plan view of an exemplary combination proof sheet and order form 22 that may be utilized with the system 10 of FIG. 1 to select one or more images from an array of thumbnail images such as 52 (FIG. 3C) for final printing. By way of example, there are twenty-five thumbnail images labeled "I" in FIG. 3A arranged in an array of four rows and eight columns on the form 22. The term "thumbnail" is a term of convenience used to describe printed graphical representations of reduced size and/or quality that are sufficiently small so that an array of the same can be printed on a single sheet of paper for simultaneous viewing and evaluation by a user. The thumbnail images I are preferably printed in color, although they could be black and white. They are made up of microscopic pixels of color pigment applied in a well known manner to achieve the image definition, tone, shading, resolution and other image characteristics required. The thumbnail image 52 and the image on the final print sheet 48 (FIG. 5) have been shown as line drawings due to the limitations imposed on permissible patent drawings. It will be understood that the thumbnail images I are typically of lower quality than the final print images. The thumbnail images are displayed in an array to allow the user to quickly and easily select which of the digitally stored images transferred from the camera 12 that he or she wants to print or save in final, higher quality form.

The combination proof sheet and order form 22 (FIG. 3A) includes image selection user designation areas such as 54 (FIG. 3C) adjacent each of the thumbnail images I. The user designation areas 54 include rows and columns of bubbles 56 that can be manually filled in by a user with a pen or a pencil. Other discrete regions could be utilized as user designation areas such as vertical stripes or slots between two adjacent vertical bars. The user designation areas could consist of discrete bounded regions in which a user could write in print or cursive form numbers, digits or symbols that could be read with optical character recognition (OCR) software. Alternatively, a user could punch out holes or apply stickers or conductive markers. Besides optical scanning, the printer could use electrical or mechanical detection of the completed user designation areas. The user designation areas 54 of the form 22 also include user readable printed indicia in the form of the column headings "Size" and "Qty" (quantity) in addition to row headings "3.5×5", "4×6", "5×7", "8×10" and "Cstm". The user designation areas are labeled "B" in FIG. 3A. The user can fill in one or more bubbles 56 in the user designation area B adjacent a particular thumbnail image I to "order" the desired number and size of final prints of that digitally stored image. Filling in the bubble next to "Cstm" causes the ink jet printer 14 to generate the custom proof sheet and order form 58 (FIG. 4) for that particular thumbnail image on a single sheet of paper. The layout and use of the custom form 58 will be described in detail later on.

Referring again to FIG. 3A, the combination proof sheet and order form 22 further includes a first identity marker 60 and a second identity marker 62. Each of these identity markers may take the form of a checkerboard grid as shown in FIGS. 3D and 3F. Each identity marker 60 and 62 has a unique pattern that is associated with the set of digital images that have been used to generate the proof sheet and order form 22. The markers 60 and 62 thus identify the contents of, for example, the flash memory card 16. When the completed form 22 is re-inserted into the ink jet printer 14, the identity markers 60 and 62 are scanned and compared to a code associated with the set of digital images currently stored in the printer 14 and/or flash memory card 16 residing therein. If there is no match, the user is warned via message on the display 34. This prevents the system from printing images and/or user designated enhancements from a reinserted form that do not correspond to the digital images currently available to the printer.

Figure 3E:
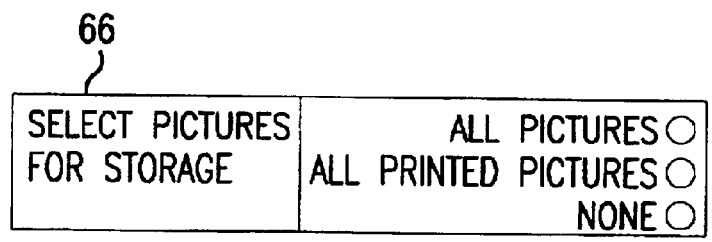

An "All Pictures" user designation area 64 (FIGS. 3A and 3B) is printed on the upper left corner of the form 22. It has no thumbnail image but has the Size and Qty indicia and associated bubbles to allow the user to order that all portrayed thumbnail images I be printed in particular sizes and quantities. Finally, the combination proof sheet and order form 22 also includes a "Select pictures for storage" user designation area 66 (FIGS. 3A and 3E) with associated indicia and bubbles. This feature allows the user to designate that all images, all images designated for final printing, or no images are to be permanently stored in the memory of the ink jet printer 14 or in a PC connected to the ink jet printer 14, or in some other permanent fashion.

The ink jet printer 14 could have a cache memory larger than that normally found in the camera 12 but smaller than the RAM memory of a PC connected to the ink jet printer 14. The ink jet printer 14 could be programmed to store the images transferred from the camera 12 and after reading the completed order form 22, transfer selected images to the PC for permanent storage when the printer detects that the PC has powered up. This empties the RAM 30 of the ink jet printer 14 for receiving new images.

Figure 4:
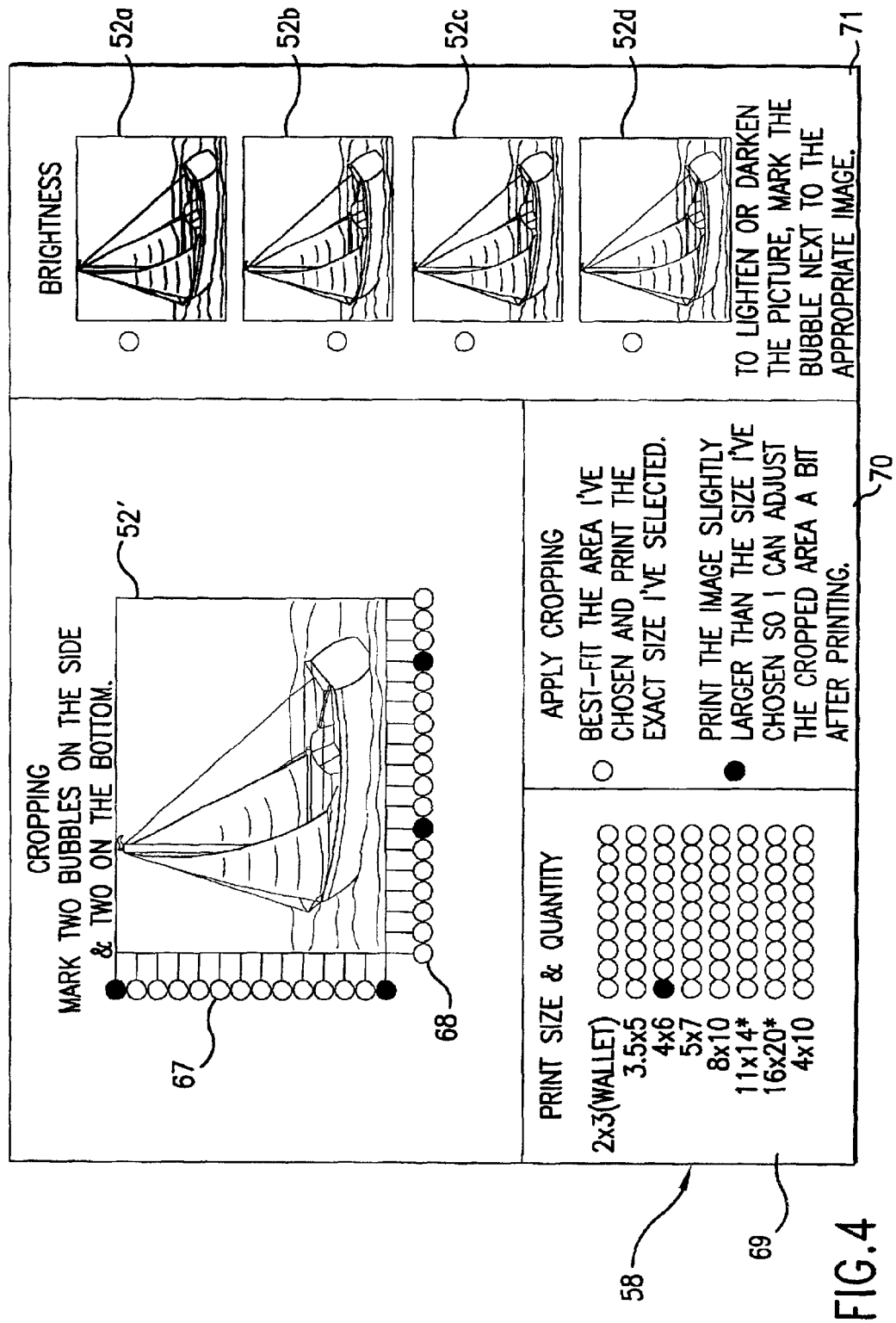
FIG. 4 illustrates a custom proof sheet and order form that may be utilized with the system of FIG. 1 in cropping a single image and selecting the brightness thereof for final printing.

FIG. 4 is a plan view of the custom proof sheet and order form 58 that may be utilized with the system of FIG. 1 in cropping a single image and selecting the brightness thereof for final printing. Print size, print quantity and picture brightness may also be selected via the custom order form 58. The custom order form 58 includes a substantially enlarged version 52' of the thumbnail corresponding image on the form 22 whose "custom" bubble 56 was previously filled in. Again the image 52' has been shown diagrammatically in FIG. 4 due to the limitations on the permissible form of patent drawings. In reality, the image 52' would be a graphical image printed on the form 58 via a complex pattern of tiny pixels. A series of equally spaced bubbles 67 and a series of equally spaced bubbles 68 along the left vertical and bottom horizontal side edges, respectively, of the enlarged image 52' may be filled in by the user to crop the image 52'. In FIG. 4 two of the bubbles 67 and two of the bubbles 68 have been filled in or darkened to give an example of the manner in which a user would designate cropping, which is one form of image enhancement described herein. The indicia or notation "Cropping—Mark two bubbles on the side & two on the bottom" appears above the enlarged thumbnail image 52' on the custom form 58.

The custom proof sheet and order form 58 (FIG. 4) further includes a "Print Size & Quantity" user designation area 69 similar to the user designation area 54 of the form 22 except that the former includes additional print sizes such as "2×3 (wallet)", "11×14", "16×20" and "4×10". In addition, the custom proof sheet and order form 58 also includes a user designation area 70 labeled "Apply Cropping". By filling in the appropriate bubble, this feature enables the user to best-fit the designated cropping to the selected print size. Such a feature is necessary because the rectangular proportions of the cropping selected by the user in filling in selected ones of the bubbles 67 and 68 along the borders of the enlarged thumbnail image 52' may not match the rectangular proportions of the print size selected with the user designation area 69. Alternatively, this feature enables the user to specify that the final print of the selected image should be larger than the print size selected so that further cropping can take place on the next printing or the user can simply use scissors to cut a print down to the desired size.

The custom proof sheet and order form 58 (FIG. 4) further includes a "Brightness" user designation area 71 on the right hand side thereof. This area includes four thumbnail images 52a, 52b, 52c and 52d with progressively less brightness in the actual graphic printing of these images. The user fills in the bubble adjacent one of the four thumbnail images 52a, 52b, 52c or 52d to select the level of brightness desired in the final print using the different brightness levels depicted. Brightness is another form of image enhancement referred to herein.

Figure 6A:
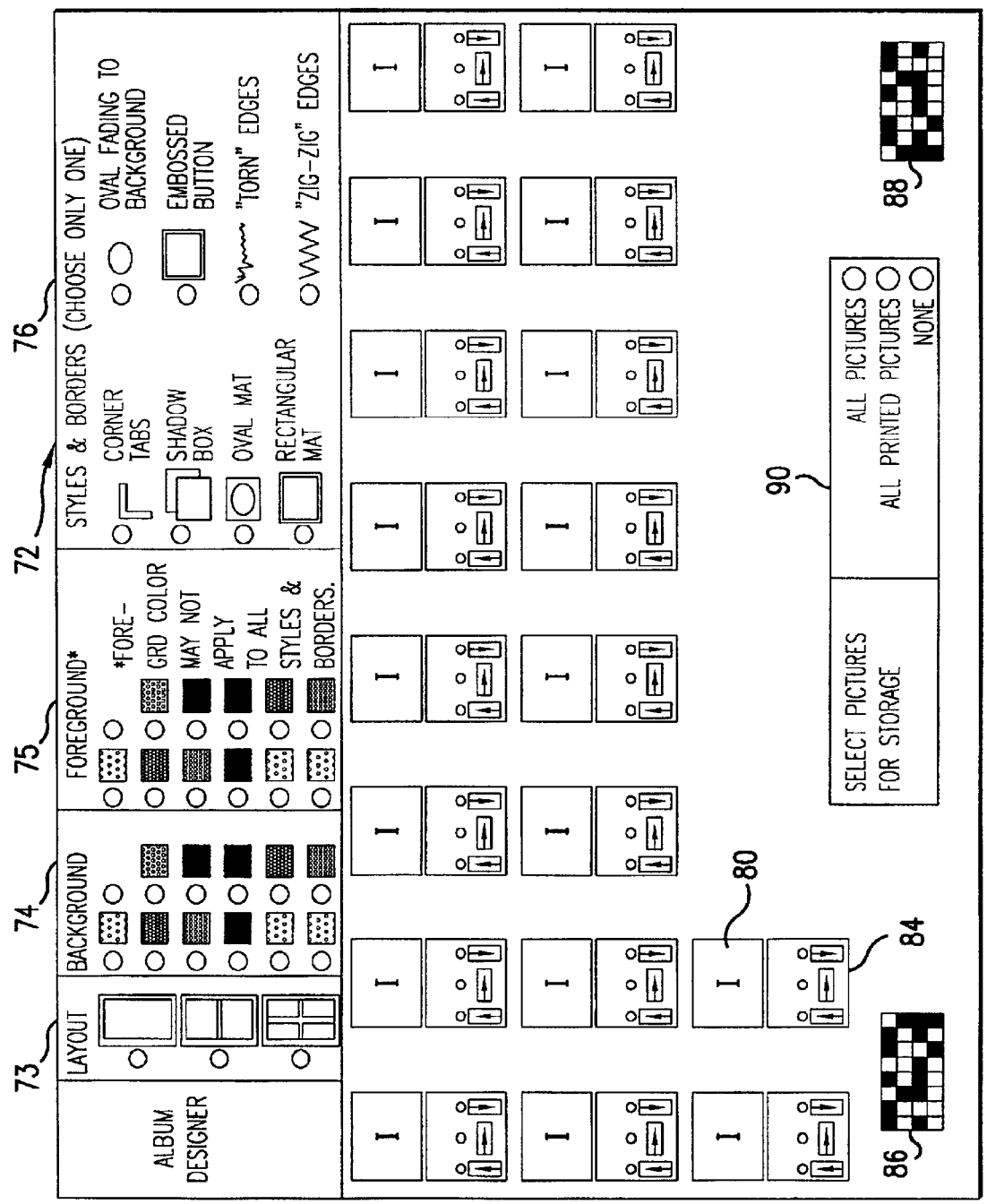
FIGS. 6A and 6B illustrate an alternate combination proof sheet and order form that may be utilized with the system of FIG. 1 in designing and printing pages for a digital photo album.

FIG. 6A is a plan view of an alternate proof sheet and order form 72 that may be utilized with the system of FIG. 1 in designing and printing pages for a digital photo album. The album form 72 is preferably printed on a single sheet of paper in response to the pressing of one or more of the push buttons 32 on the ink jet printer 14 or by filling in a bubble on one of the forms 22 or 58. The album form 72 includes user designation areas 73 for image "Layout", 74 for "Background", 75 for "Foreground" and 76 for "Styles & Borders". Each of these user designation areas presents relevant choice options, each having an adjacent bubble that can be filled in or completed to designate a choice. The choices available and their purposes are evident from FIG. 6A and need not be further described. The album form 72 further includes plurality of thumbnail images such as 80 (FIG. 6B) each having adjacent "Add to album" and "Rotate Image" designation options 82 and 84 for the corresponding thumbnail image. Again, due to the restrictions on patent drawings, the thumbnail images I cannot be shown in their true color graphical form in FIGS. 6A and 6B. The images are shown as boxes labeled I in FIG. 6A and as a line drawing in FIG. 6B. It will be understood that in FIG. 6A each thumbnail image I is shown with its adjacent user designation area below the same that permits the user to add the image to the album and rotate the same. Identity markers 86 and 88 (FIG. 6A) on the album form 72 serve the same function as the identity markers 60 and 62 (FIG. 3A) of the form 22. A "Select pictures for storage" user designation area 90 (FIG. 6A) on the album form 72 permits the user to select, by filling in the appropriate bubble, "All pictures", "All printed pictures" or "none" for permanent storage.

It will be apparent to those skilled in the art that other forms of image enhancement could be selected on the forms 22, 58 and 72 such as color balance. In addition, if date information has been stored when each image was taken, the user could designate on an order form that the final print is to include a superimposed picture date. Many other possibilities and combinations for image selection and/or image enhancement will occur to those skilled in the art and need not be specifically described herein.

Figures 6B, 7:
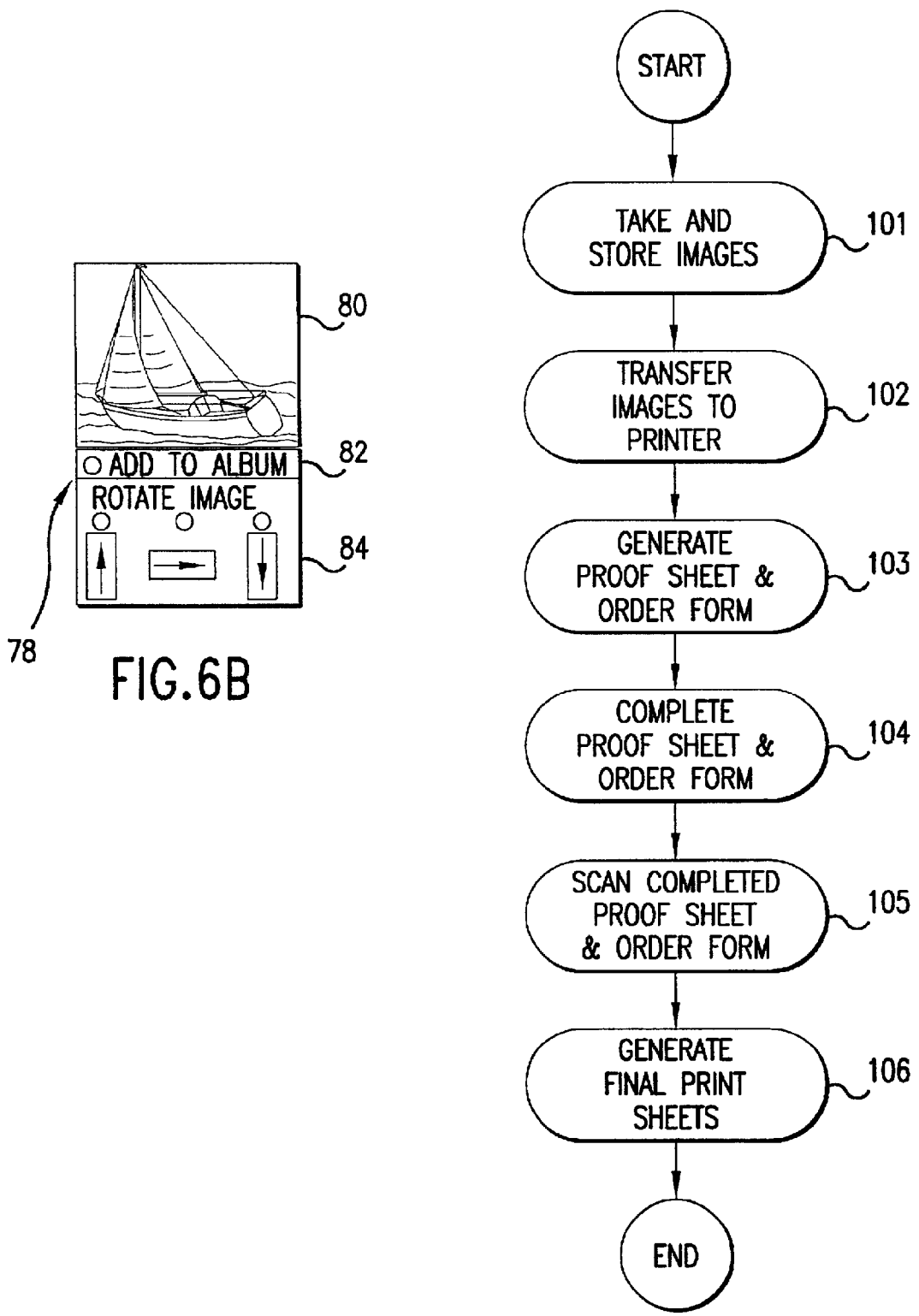
FIG. 7 is a flow diagram of the basic method of the method of the present invention for enabling a user to select and print digitally stored images.

In accordance with the present invention a method is also provided for enabling a user to select and print digitally stored images. Referring to FIG. 7, the method involves the following steps. The first step involves taking and storing digital still representations of a plurality of images. The second step 102 of the method involves transferring the digital still representations of the plurality of images to a printer capable of generating graphical representations of selected ones of the plurality of images on a preselected print media. The third step 103 of the method involves generating with the printer a combination proof sheet and order form including a graphical representation of at least one of the images and a plurality of image selection and/or image enhancement user designation areas. The fourth step 104 of the method involves completing at least one of the user designation areas on the combination proof sheet and order form. The fifth step 105 of the method involves using the printer to read the combination proof sheet and order form to determine the user designation areas completed by the user. The sixth and final step 106 of the method involves generating with the printer at least one final print sheet with the images and enhancements designated by the user on the combination proof sheet and order form.

FIG. 7 illustrates only a very top level view of our method. It will be understood that there are a wide range of subroutines and options that can be followed in selecting and printing digitally stored images. For example, the combination proof sheet and order form 22 of FIG. 3 could first be printed, completed, re-inserted into the ink jet printer 14 and scanned. The printer could then print a half dozen custom forms 58 (FIG. 4) which could then be completed and fed through the ink jet printer 14 in succession with final print images being printed in succession as ordered. Thereafter, the album form 72 (FIG. 6) could be completed and scanned.

Our invention thus provides a system and method for enabling a DSC user to quickly and easily decide what images to print, what size to print them in, and the number of prints of each image that are to be printed. The order form technique that we have developed is greatly advantageous in that it eliminates the need for the user to connect the DSC to a PC, while at the same time eliminating the need for a complicated and expensive GUI on the printer. Many DSC users are well familiar with filling out forms that include brief word instructions and bubbles for making selections in other aspects of every day life such as standardized test taking, survey responses, mail order catalog forms and the like. Our invention has the advantage of minimizing the amount of paper, ink and toner that would otherwise be consumed in prior camera-direct-to-printer systems which typically require all images to be printed. Our invention further has the added benefit of allowing sophisticated color photographic prints to be "ordered" quickly and easily, while at the same time being environmentally friendly by eliminating the use of developers and other chemicals associated with conventional silver halide photography.

Considering now in further detail the storage and retrieval of digital images using the combination proof and order sheet 22, the sheet 22 can have one or more identity markers 60, 62 which individually or collectively contain a unique pattern associated with the set of digital images used to generate the proof sheet 22. As best understood with reference to FIG. 8, the combination proof and order sheet 22 can be advantageously used in a system 10' according to the present invention so as to store and retrieve digital images. The system 10' includes a multifunction printer 14' having both printing and optical scanning capabilities operable either programmatically from a host computer 200 connected via a host computer link 202 to one of a plurality of I/O ports 50 on the printer 14', or manually by one or more of the pushbuttons 32 on the printer 14'. The multifunction printer 14' can print documents, including the proof sheet 22 and photo-quality prints of individual digital images, and deliver these documents to the print output tray 120 for retrieval by the user. A printed document, such as the user-completed proof sheet 22, can be placed on a scan platen 122 and optically scanned by the multifunction printer 14'. If a marked proof sheet 22 is placed on the scan platen 122, the multifunction printer 14' also detects and interprets the markings made by the user in the image selection user designation areas 54 and the "Select pictures for storage" user designation area 66, associates each of the individual image selection user designation areas 54 with a corresponding digital image using the identity marker 60', and carries out the operations specified by the user on the associated digital images. The printer 14' may contain another I/O port 50 to which a digital camera 12 can be connected via a direct data link 20, and a memory card reader 24 into which a memory card 16 removed from the camera 12 may be inserted. In addition, some printers 14' contain printer identification information 124 which may include the printer manufacturer, model number, serial number, and the like.

The system 10' further includes a data key generator (not shown), preferably implemented as a firmware module in the ROM 28 of the printer 14' which is executed by the CPU 26. However, the data key generator may alternatively be implemented as a software module in the host computer 200. The data key generator generates data keys corresponding to individual image files. Each data key, alone or in combination with other information, uniquely identifies the corresponding image file for storage and retrieval. As will be explained subsequently in further detail, each data key may be generated from the contents of the corresponding image file, or from an index number provided by the printer 14' which is unique to each image file. In some embodiments, a data key may also include the printer identification information 124, user account information for the file server 230, or both.

The system 10' also includes an identity marker generator (not shown), preferably implemented as a firmware module in the ROM 28 of the printer 14' which is executed by the CPU 26. However, the identity marker generator may alternatively be implemented as a software module in the host computer 200. The identity marker generator formats and prints the identity marker 60' on the proof sheet 22. As part of the formatting and printing, the identity marker generator formats and prints a representation of the appropriate data keys within the identity marker 60'. The data keys that are printed on the proof sheet 22 are the data keys for those image files that correspond to the thumbnail images 52 which are printed on the proof sheet 22. The identity marker 60' may further include the machine identification information 124 for the printer 14', or user account information, printed separately from the data keys. In operation, when a user presses a pushbutton 32 to print a combination proof and order sheet 22 for those images presently loaded into the printer 14' from the digital camera 12 or the memory card 16, the data key generator generates the data keys, and the identity marker generator then uses the data keys to print the identity marker 60' on the proof sheet 22.

Considering now in further detail the host computer 200, the computer 200 includes subsystems which operate in conjunction with the multifunction printer 14' to store digital images to, and retrieve them from, a mass storage device such as a local mass storage peripheral device 220 (such as a hard disk, CD-ROM disk, CD-Rewriteable disk, or the like), or a file server computer system 230. The subsystems on the host computer 200 include a storage subsystem 202 and a retrieval subsystem 206 which are preferably implemented as modules of a software program executed by the computer 200. However, other arrangements are contemplated by the present invention, such as having certain subsystems, or portions thereof, implemented in firmware or hardware of the multifunction printer 14' instead of the computer 200. In operation, the printer 14' invokes the subsystems 202, 206 as required. For example, when the user places a marked proof sheet 22 on the scanner platen 122 and presses a pushbutton to scan the user-marked proof sheet 22, the printer 14' detects the user designation areas 54, 66 and determines the operations requested by the user. If the user has marked the areas 54, 66 to indicate that image files received by the printer 14' from the digital camera 12 or memory card 16 are to be stored, the printer 14' invokes the storage subsystem 202 to store the image files on the mass storage device. If the user has marked the areas 54, 66 to indicate that image files previously stored on the mass storage device are to be printed, edited, or the like, the printer 14' invokes the retrieval subsystem 206 to retrieve the image files from the mass storage device.

Considering now in further detail the storage subsystem 202, the storage subsystem 202 preferably receives from the printer 14' the image files to be stored and the associated data keys. In an alternate embodiment, the storage subsystem 202 may generate the corresponding data key for each image file instead of receiving it from the printer 14'. In some embodiments, the storage subsystem 202 may embed the data key into the image file prior to storage, and/or convert the data key into a file specifier at which the image file will be stored. The image file, and in some embodiments the data key, are then stored on the mass storage device. If the mass storage device is a local peripheral 220, the image file is preferentially stored at the location indicated by the file specifier. If the mass storage device is a file server 230, the image file (and data key, if appropriate) are preferentially stored under the user account at a location selected by the file server.

Considering now in further detail the 206, the retrieval subsystem 206 receives from the printer 14' the data keys of the image files to be retrieved. If the image file was stored on the mass storage device at a file specifier derived from the data key, the data key is processed to again derive the same file specifier, and the image file is retrieved using the file specifier. If the storage location of the image file was left to the file server 230 to determine, the data key is sent to the file server 230 (along with the user account information) in order to retrieve the image file. The retrieval subsystem 206 then sends the retrieved image file to the printer 14' for printing, editing, or the like.

Figure 9D:
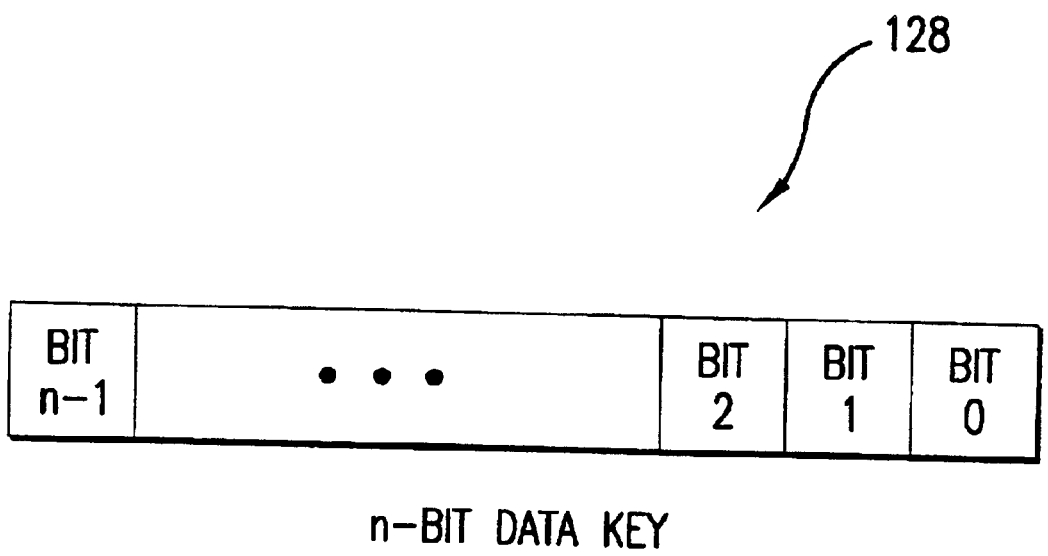
FIG. 9D is a schematic diagram illustrating the format of a data key, a representation of which is incorporated in the identity markers of FIGS. 9A–9C.

Considering now the in further detail, and with reference to FIG. 9D, each data key 128 is digitally represented as an n-bit number, the individual bits of which can be conventionally referred to as bit 0 (the least significant bit) through bit n−1 (the most significant bit). In a preferred embodiment, this n-bit number is generated by processing the contents of the corresponding image file. Preferably this processing includes performing a data reduction operation, such as a cyclic-redundancy check (CRC), on the contents of the image file. CRC algorithms are well known to those skilled in the art. Since the data keys 128 will be used to retrieve the image file at a later time, it is desirable to minimize the risk that a data key 128 will retrieve the incorrect file. Accordingly, the larger the value of n (i.e. the more bits in the data key), the lower the risk of improper file retrieval. In an alternative embodiment, the n-bit data key 128 is not derived from the image file contents, but rather is the next in a series of consecutively-numbered values maintained by the individual printer 14', such as an incrementing index number associated with the image.

If it is desired to further lower the risk of improper file retrieval, such as in situations where a very large number of image files will be stored on the storage device, or where image files from more than one printer 14' will be stored on the storage device, then the printer identification information 124, user account information for the file server 230, or both, can be incorporated into each data key 128, typically by appending a number of additional bits containing this information to the data key 128.

Considering now in further detail the identity marker 60', and with reference to the exemplary identity markers 130, 134, and 138 of FIGS. 9A–9C, the identity marker contains information sufficient to derive the data keys 128 for the image files displayed on the proof sheet 22 as thumbnail images 52. The exemplary identity markers 130, 134, 138 each specify eight data keys 128. Each n-bit data key 128 may be converted for printing purposes into a data key representation of a non-numeric graphical pattern, such as exemplary binary data key representation 132; or an alphanumeric printed pattern, such as exemplary hexadecimal data key representation 136. This conversion is preferentially performed by the printer 14', but could alternatively be performed by the host computer 200.

The patterns in each identity marker 60' can be arranged linearly, as illustrated by way of example in FIG. 9B; in a matrix, as illustrated by way of example in FIG. 9A; or in any other manner known to those skilled in the art. The size and shape of the alphanumeric characters and the non-numeric patterns are preferably chosen such that the identity marker 60' can be reliably located and converted back into the correct data keys 128 by the scanner 46. Alternatively, more than one identity marker, such as identity markers 60 and 62 of FIG. 3A, may be employed. The multiple markers may be identical, in order to provide redundancy in the event that a portion of the proof sheet 22 is damaged. The multiple markers may alternatively be mirror images or rotations of each other, sometimes with a certain portion marked differently so as to indicate whether or not the marker has a normal orientation or a mirrored orientation.

In some embodiments, the identity marker 60' may incorporate additional printed representations, such as exemplary representation 142, which represents the machine identification information 124 for the printer 14', or the user account information for the user's file server account.

Alternate embodiments may be used in order to reduce the size of the printed identity marker 60'. In the exemplary marker 138, where the data keys 128 are consecutively-numbered values such as an incrementing image index number assigned by the printer 14', it is not necessary to print all the data keys 128. Rather, the first-numbered data key 128 may be printed, such as exemplary data key representation 140, followed by a count of the total number of data keys 128 in the identity marker 60', such as exemplary data key count 144. Since each data key 128 is associated with a thumbnail image 52 printed on the proof sheet 22, and since the number of printed thumbnail images can be determined when the proof sheet 22 is scanned, some embodiments of the identity marker 60' may not include the data key count 144.

The identity marker 60' has a predetermined format that allows the individual data key representations within the marker 60' to be associated with a corresponding individual one of the thumbnail images 54, which is in turn associated with an individual image file to be stored or retrieved. This predetermined format is used for printing the proof sheet 22. Once the scanning system locates the identity marker 60' on a user-marked proof sheet 22, the predetermined format allows the printer 14' to locate the appropriate data key representation to be sent to the storage subsystem 202 or the retrieval subsystem 206.

Another embodiment of the present invention, as best understood with reference to FIGS. 10A through 10H, is a method 250 for retrievably storing a plurality of digital image files onto a storage device. The method begins at 252 by acquiring digital image files from an image source device, such as a digital camera 12 or a memory card 16. At 254, at least one identity marker 60' indicative of the digital image files is formed. At 256, an image representation for each image file, such as a thumbnail image 52, is printed on a proof sheet 22. At 258, at least one of the user designation areas 54, 66 associated with the image representations on the proof sheet 22 is printed. At 260, the identity marker or markers are printed on the proof sheet 22. At 262, a copy of the proof sheet for use in retrieving the image files from the storage device at a future time is made. The proof sheets 22, or copies thereof, may be kept by the user in a proof sheet archive 126 for convenient access at a future time when file retrieval is desired. At 264, the user designation area or areas 54, 66 on the proof sheet 22 are marked in order to select the image files to be stored. At 266, the marked proof sheet is scanned in order to detect the markings in the user designation areas 54, 66. At 268, the user markings are process in order to identify the image files to be stored. Finally, at 270 the identified image files, as well as any supporting files needed for retrieval, are stored onto the storage device, and the method ends.

Figure 10A:
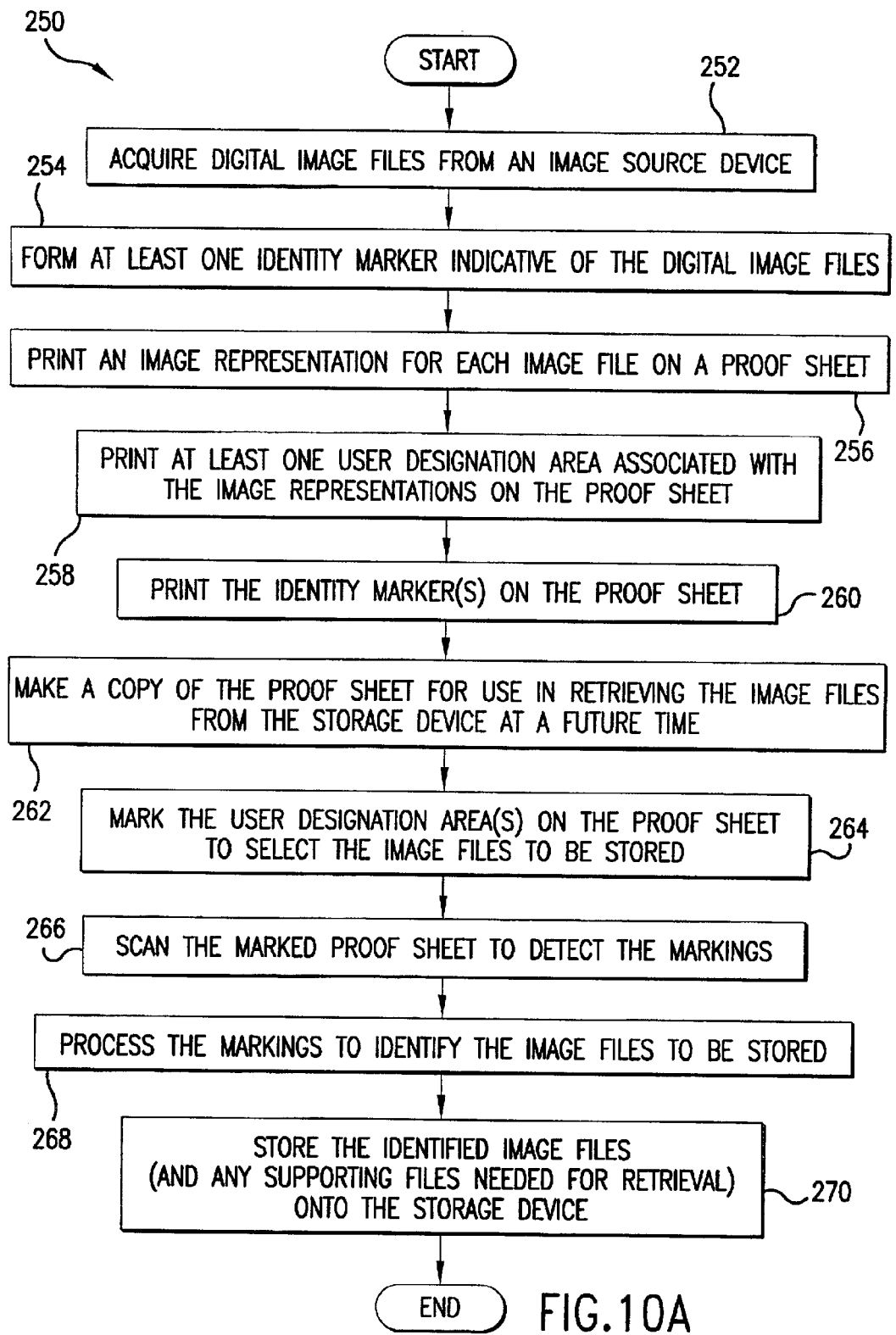
FIGS. 10A–10H are flowcharts of differing levels of a method of storing images on the system of FIG. 8.
Figure 10B:
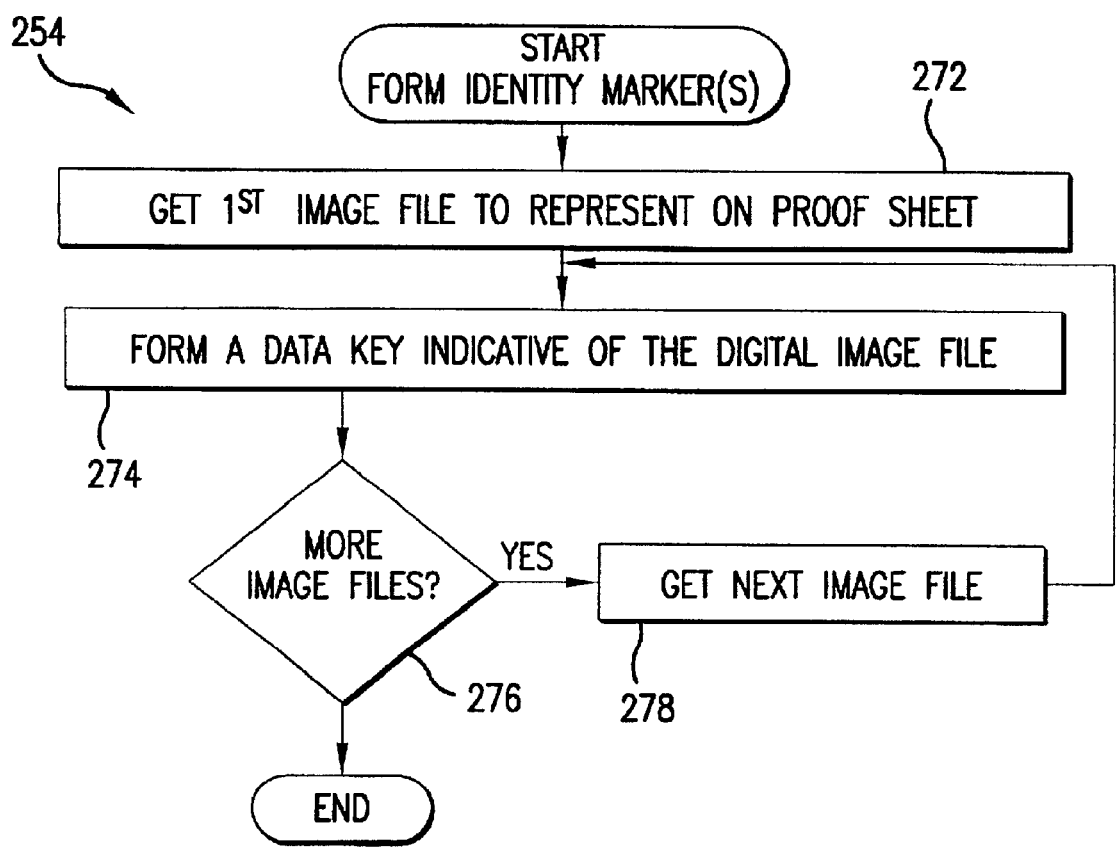

Considering now in further detail, with particular reference to FIG. 10B, the forming 254 of at least one identity marker 60' indicative of the digital image files, at 272 the first digital image file that is to be printed on the proof sheet 22 is obtained. At 274, a data key 128 indicative of the digital image file is formed. If there are more image files to be printed on the proof sheet 22 ("Yes" branch of 276), then at 278 the next digital image file to be printed on the proof sheet 22 is obtained, and the method continues at 274. If there are no more image files to be printed on the proof sheet 22 ("No" branch of 276), the forming 254 ends.

Figure 10C:
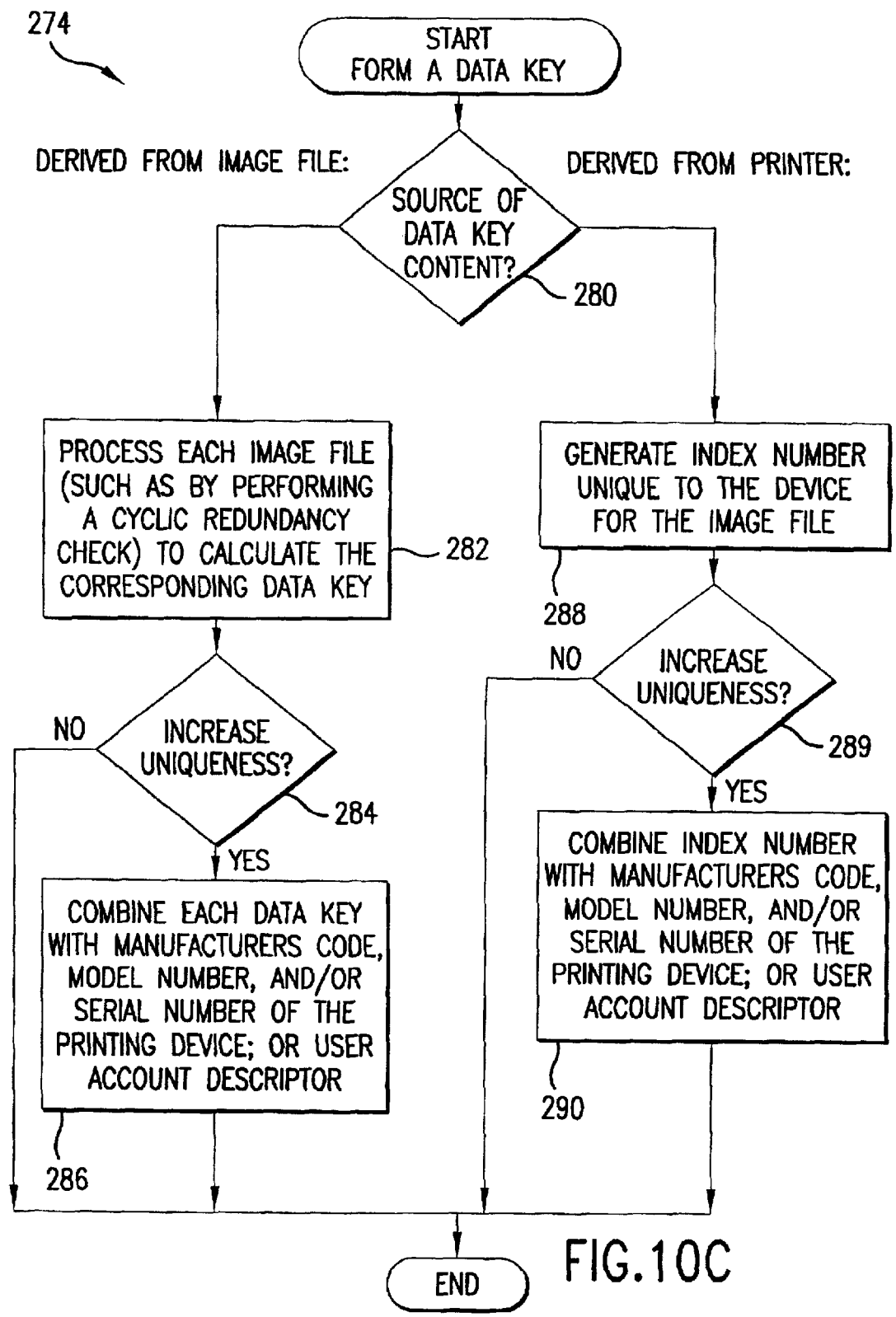

Considering now in further detail, with particular reference to FIG. 10C, the forming 274 of a data key 128 indicative of the digital image file, at 280 the source of the content of the data key is determined. If the content of the data key is determined from the content of the corresponding image file ("Derived from Image File" branch of 280), then at 282 each image file is processed to calculate the corresponding data key. As has been described heretofore, the processing preferentially includes calculating a cyclic redundancy check (CRC) value for the digital image file. If the resulting level of uniqueness provided by the CRC is adequate ("No" branch of 284), then the results may be directly used as the data key, and the forming 274 concludes. If an increased level of uniqueness is desired so as to further reduce the chances of an incorrect file retrieval in the future ("Yes" branch of 284), then at 286 the CRC value can be combined with some or all of the printer identification information 124, such as the manufacturers code, model number, and/or serial number of the printer 14', or with information descriptor of a user account on a file server 230. Then the forming 274 concludes. If the content of the data key is determined from information provided by the printer 14' ("Derived from Printer" branch of 280), then at 288 the printer 14' generates an index number, as has been described heretofore, for the data key 128. If the resulting level of uniqueness provided by the index number is adequate ("No" branch of 289), then the results may be directly used as the data key, and the forming 274 concludes. If an increased level of uniqueness is desired so as to further reduce the chances of an incorrect file retrieval in the future ("Yes" branch of 289), then at 290 the index number can be combined with some or all of the printer identification information 124, such as the manufacturers code, model number, and/or serial number of the printer 14', or with information descriptor of a user account on a file server 230. Then the forming 274 concludes.

Figure 10D:
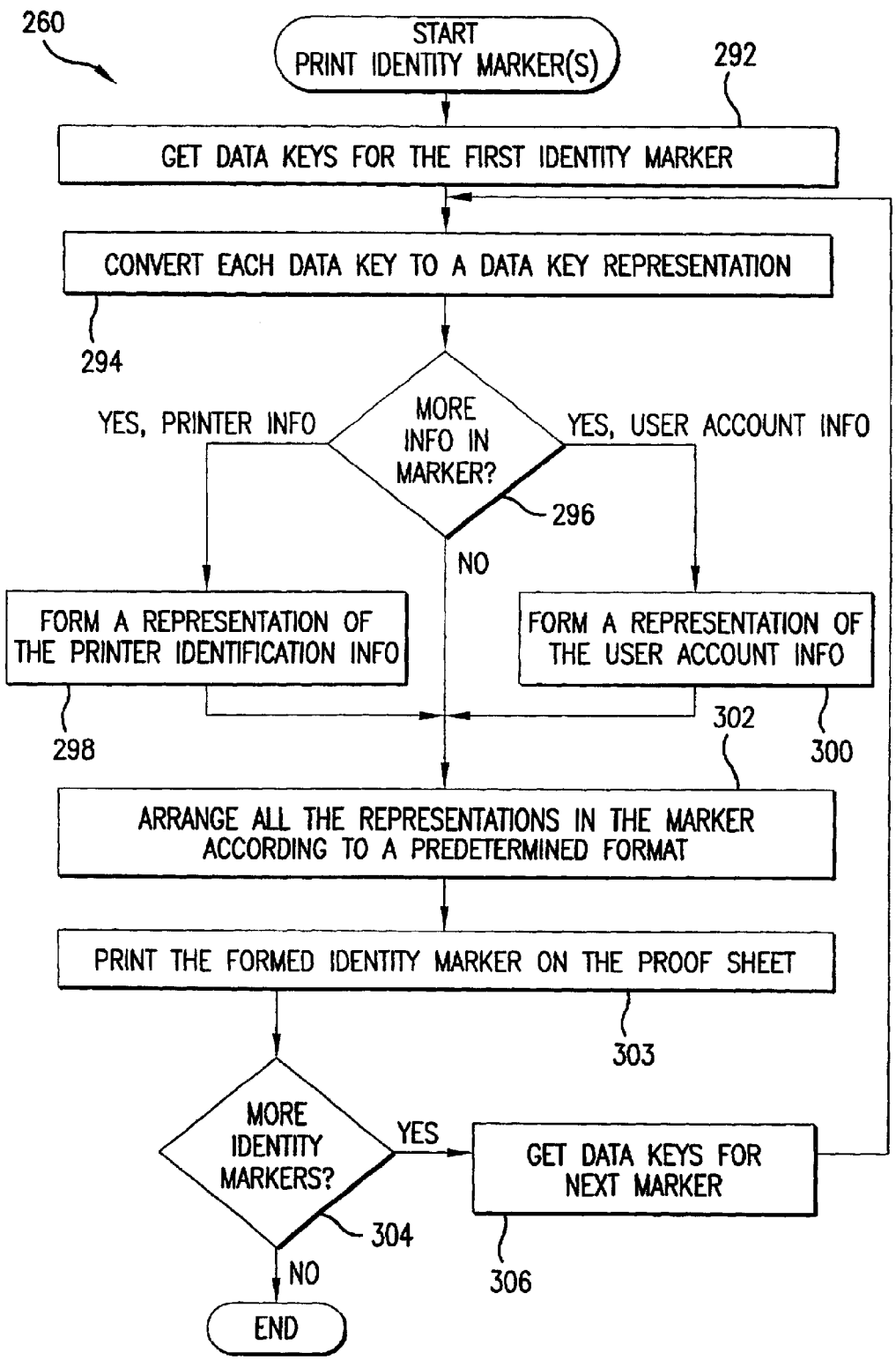

Considering now in further detail, with particular reference to FIG. 10D, the printing 260 of the identity marker or markers 60' on the proof sheet 22, at 292 the data keys for first identity marker 60' to be printed on the proof sheet 22 are obtained. At 294, each data key 128 is converted to a data key representation, such as exemplary representation 132, 136, as heretofore described. If additional printer information 124 is to be included in the data keys 128 ("Yes, printer info" branch of 296), then at 298 a representation of the printer identification information 124, such as the exemplary representation 142, is formed as heretofore described. If additional user account information is to be included in the data keys 128 ("Yes, user account info" branch of 296), then at 300 a representation of the user account information is formed as heretofore described. After the operations as 298 or 300 are performed, or if no addition information is to be included in the data keys 128 ("No" branch of 296), then at 302 all the representations in the marker 60' are arranged according to a predetermined format to form the identity marker 60' as indicated in the exemplary identity markers 130, 134, 138. At 303, the formed identity marker 60' is printed on the proof sheet 22. If there are more identity markers 60' to be printed ("Yes" branch of 304), then at 306 the data keys for next identity marker 60' to be printed on the proof sheet 22 are obtained, and the method continues at 294. If there are no more identity markers 60' to be printed ("No" branch of 304), the printing 260 concludes.

Figure 10E:
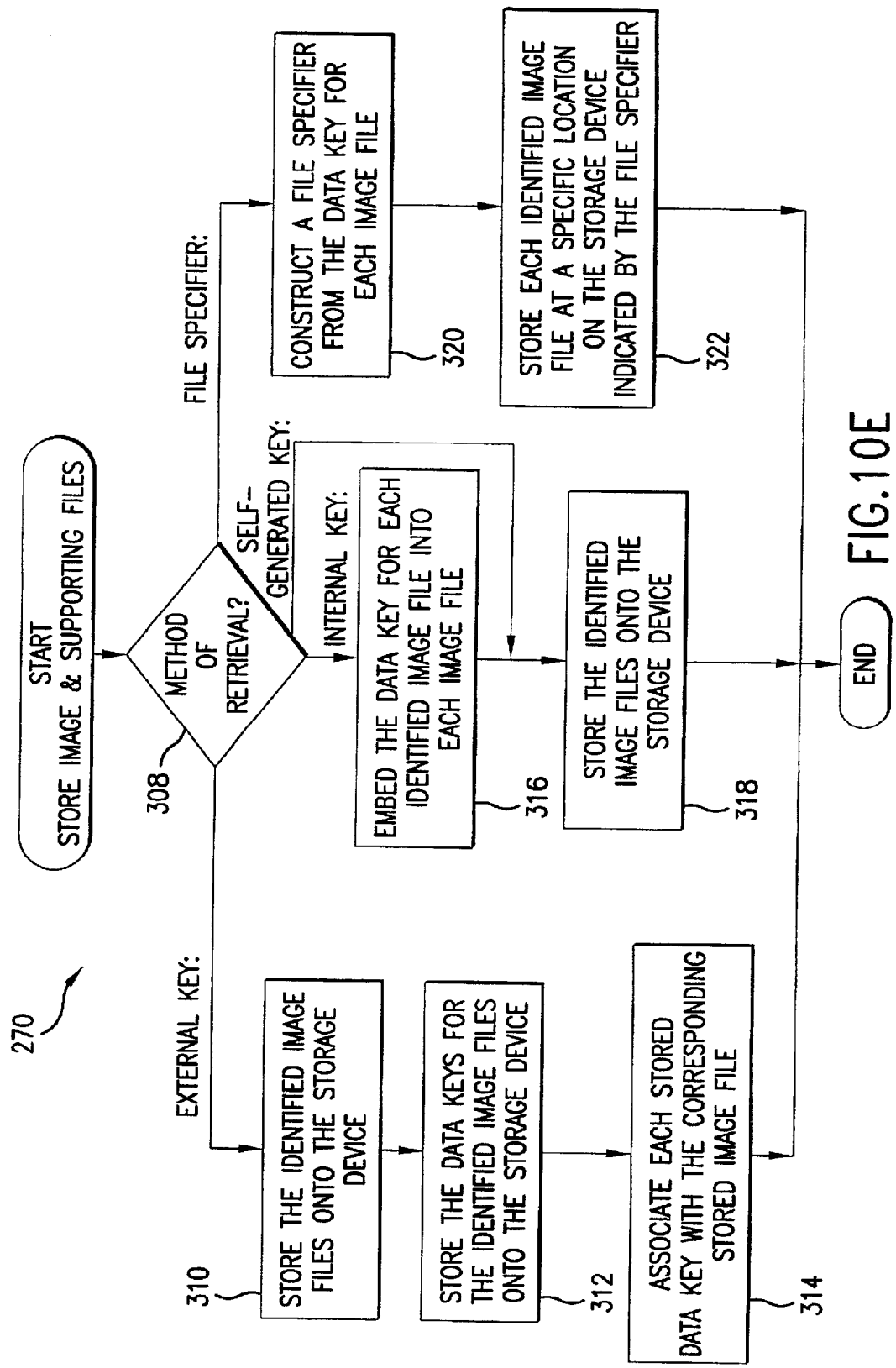

Considering now in further detail, with particular reference to FIG. 10E, the storing 270 of those image files identified for storage onto the storage device through user markings on the proof sheet 22, as well as any supporting files needed for their retrieval, at 308 the method of image file retrieval that will be used to retrieve the image file from the storage device at a future time is determined. If the retrieval method will use a data key 128 which is stored on the storage device separate from the image file ("External Key" branch of 308), then at 310 the identified image files are stored onto the storage device. At 312, the data keys for the identified image files are stored onto the storage device. At 314, each stored data key 128 is associated with the corresponding stored image file, and the storing 270 concludes. The associations are preferably implemented as a link file stored on the mass storage device, the link file containing a table of the associated data key 128 and image file pairs.

If the retrieval method will use a data key 128 which is stored on the storage device internally to the image file ("Internal Key" branch of 308), then at 316 the data key 128 for each identified image file is embedded into that image file. At 318 the identified image files are stored onto the storage device, and the storing 270 concludes.

If the retrieval method will calculate the data key 128 from the image file contents during the retrieval process ("Self-Generated Key" branch of 308), then at 318 the identified image files are stored onto the storage device, and the storing 270 concludes.

If the retrieval method will locate the file by using a file specifier derived from the data key ("File Specifier" branch of 308), then at 320 a file specifier is constructed from the data key 128 for each image file. The file specifier typically includes a logical location such as a directory pathname and a filename. At 322, each image file is stored at the location on the storage device indicated by the file specifier, and the storing 270 concludes.

Note that the above description of the storing 270 presumes that the files which are to be stored on the mass storage device are currently resident in or accessible by the printer 14'. As a result, the storing 270 may further include an error checking operation to ensure that the selected files are resident or accessible, and an error handling operation to continue or conclude the method in a logical manner should one or more files not be resident or accessible. Such operations are well known to those skilled in the art, and will not be discussed further hereinafter.

Figure 10F:
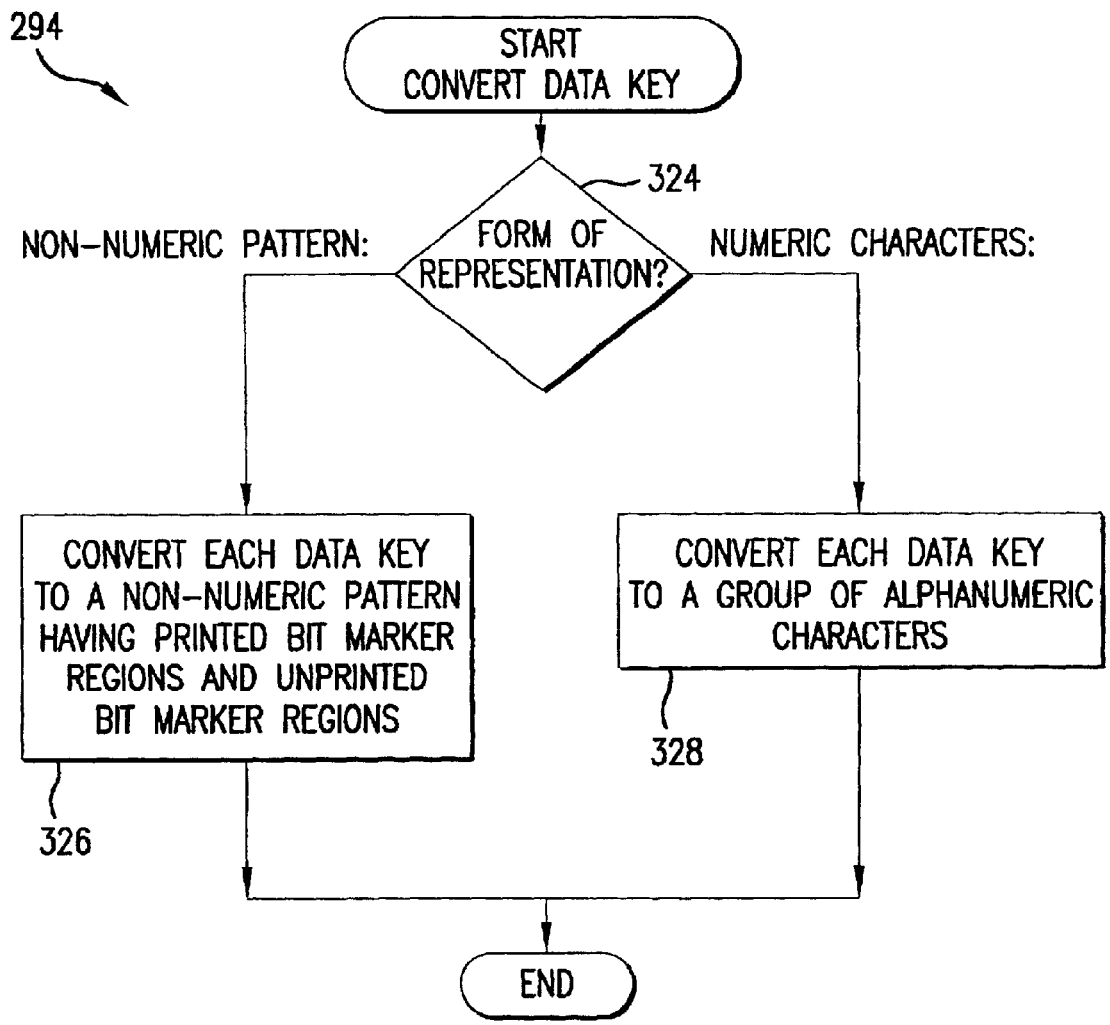

Considering now in further detail, with particular reference to FIG. 10F, the converting 294 each data key 128 to a data key representation, at 324 the form of the representation is determined. If the data key representation is as a non-numeric pattern such as the pattern of exemplary identity marker 132 ("Non-Numeric Pattern" branch of 324), then at 326 each data key 128 is converted to a non-numeric pattern such as exemplary data key 132, having printed bit marker regions 131 and unprinted bit marker regions 133, and the converting 294 concludes. If the data key representation is as a series of alphanumeric characters such as the pattern of exemplary data key 136 ("Alphanumeric Character" branch of 324), then at 328 each data key is converted to a group of alphanumeric characters representative of the data key, and the converting 294 concludes.

Figure 10G:
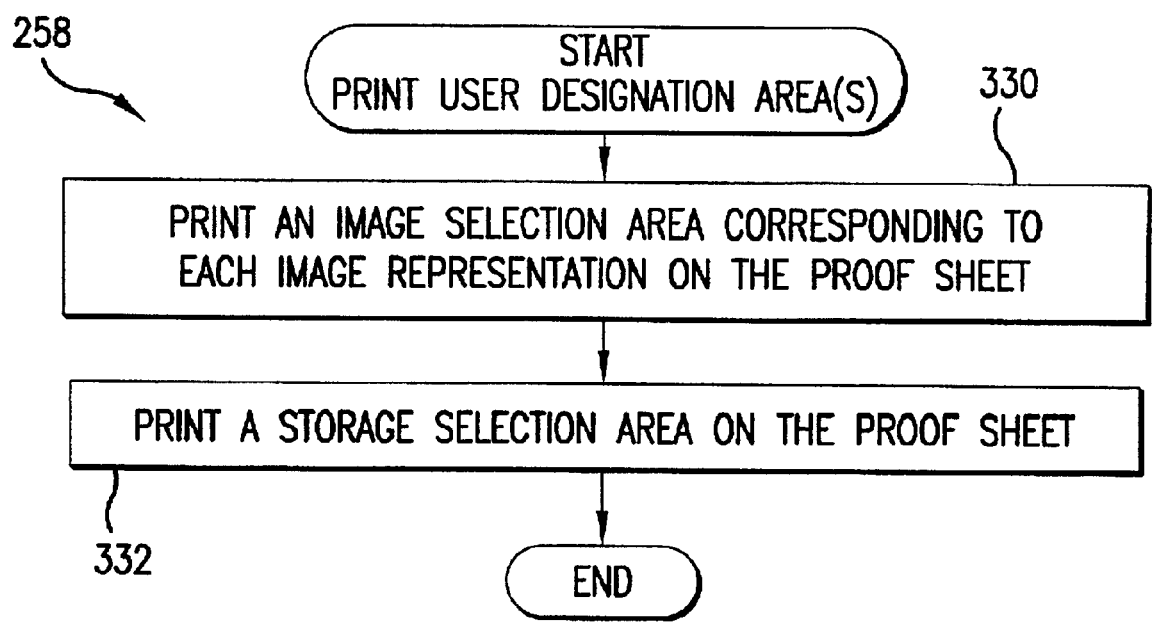

Considering now in further detail, with particular reference to FIG. 10G, a preferred embodiment of the printing 258 at least one user designation area 54, 66, at 330 an image selection area 54 corresponding to each thumbnail image 52 is printed on the proof sheet 22. At 332, a storage selection area 66 is printed on the proof sheet 22, and the printing 258 concludes.

Figure 10H:
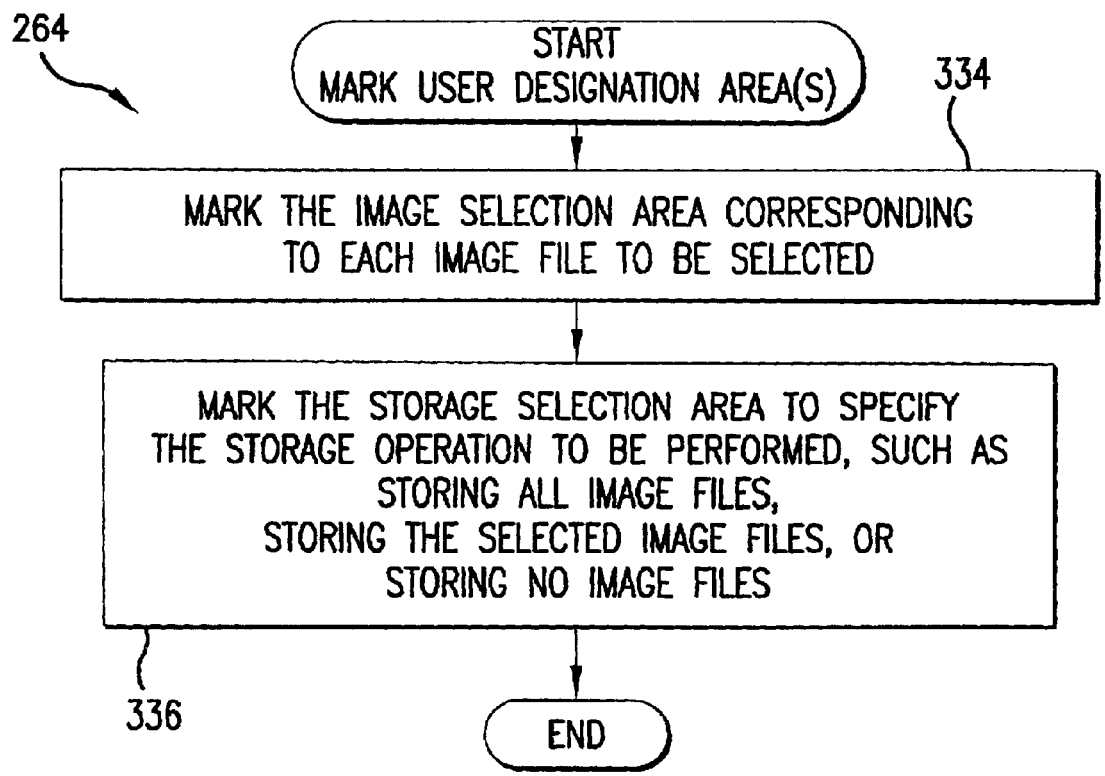

Considering now in further detail, with particular reference to FIG. 10H, the marking 264 of the user designation areas on the proof sheet 22 in order to select the image files to be stored, at 334 the image selection area 54 corresponding to each image file to be stored is marked. At 336, the storage selection area 66 to specify the storage operation to be performed is marked. In the preferred embodiment of the storage selection area 66, the user can specify that the image files corresponding to all thumbnail images 52 printed on the proof sheet 22 are to be stored; that only the image files corresponding to those thumbnail images 52 for which an operation has been marked in the corresponding image selection area 54 are to be stored; or that no image files are to be stored, but rather only that the operation marked in the image selection areas 54 are to be performed. These storage marking options just described are merely illustrative of the manner in which image file storage may be specified, and are not intended to limit the scope of the present invention to those particular marking options or modes of operation.

Figure 11A:
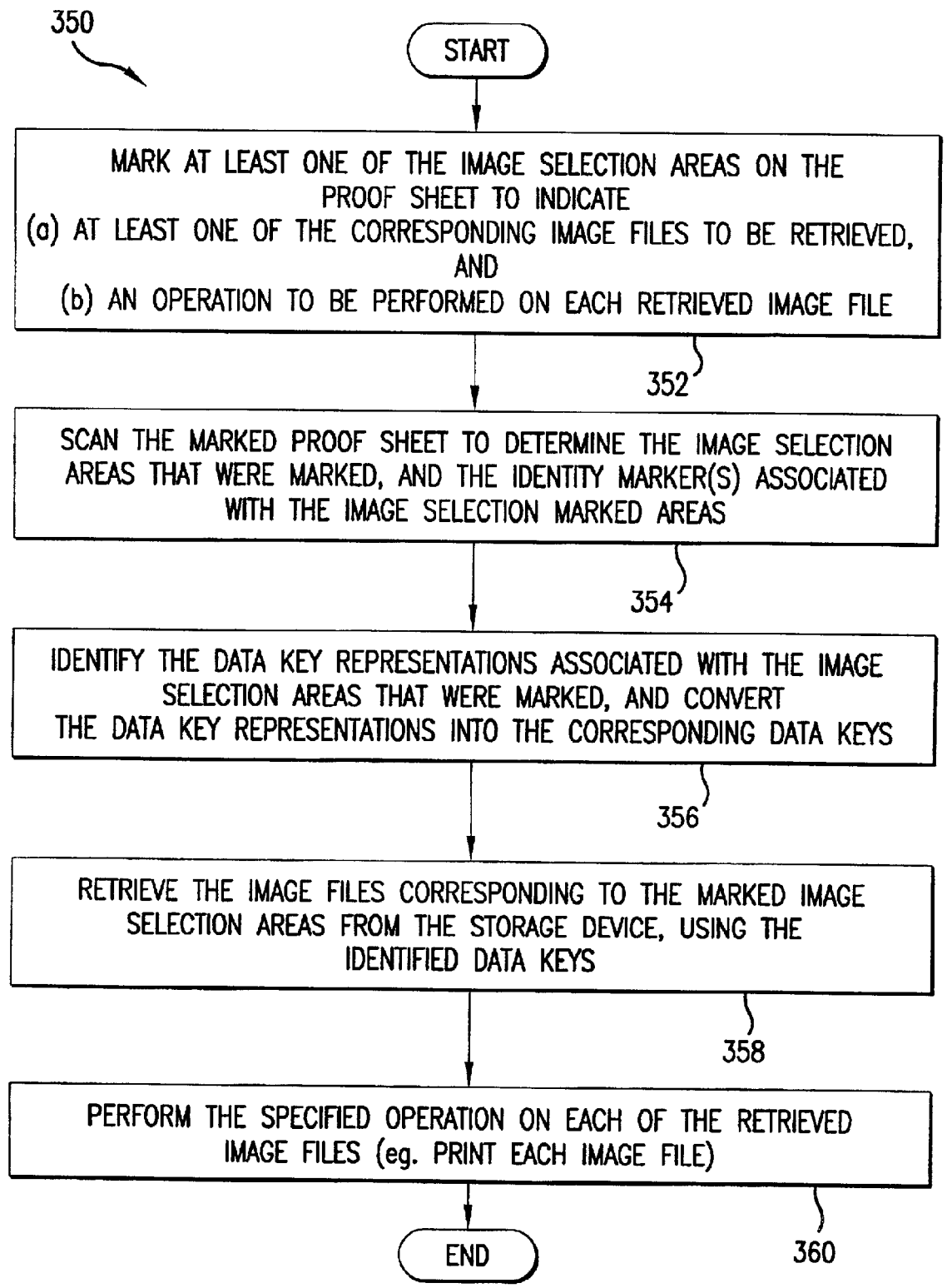
FIGS. 11A–11C are flowcharts of differing levels of a method of retrieving images from the system of FIG. 8.
Figure 11B:
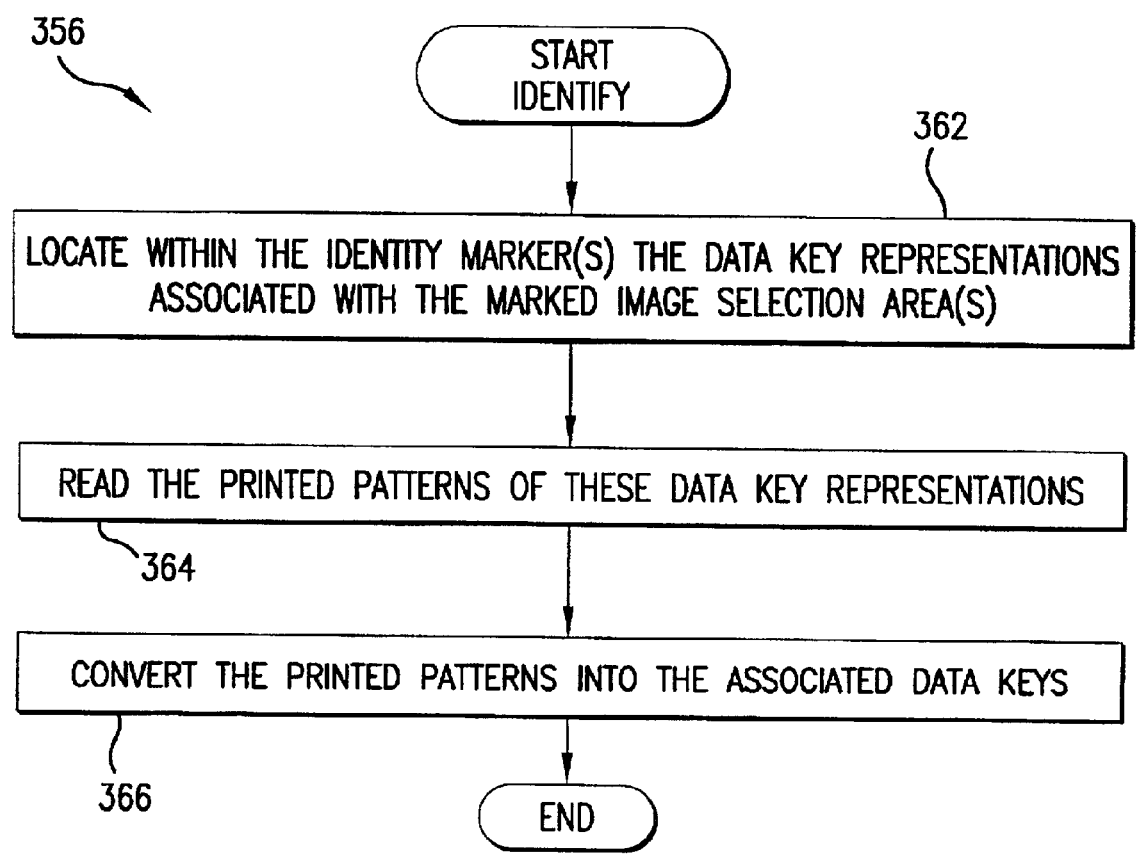
Figure 11C:
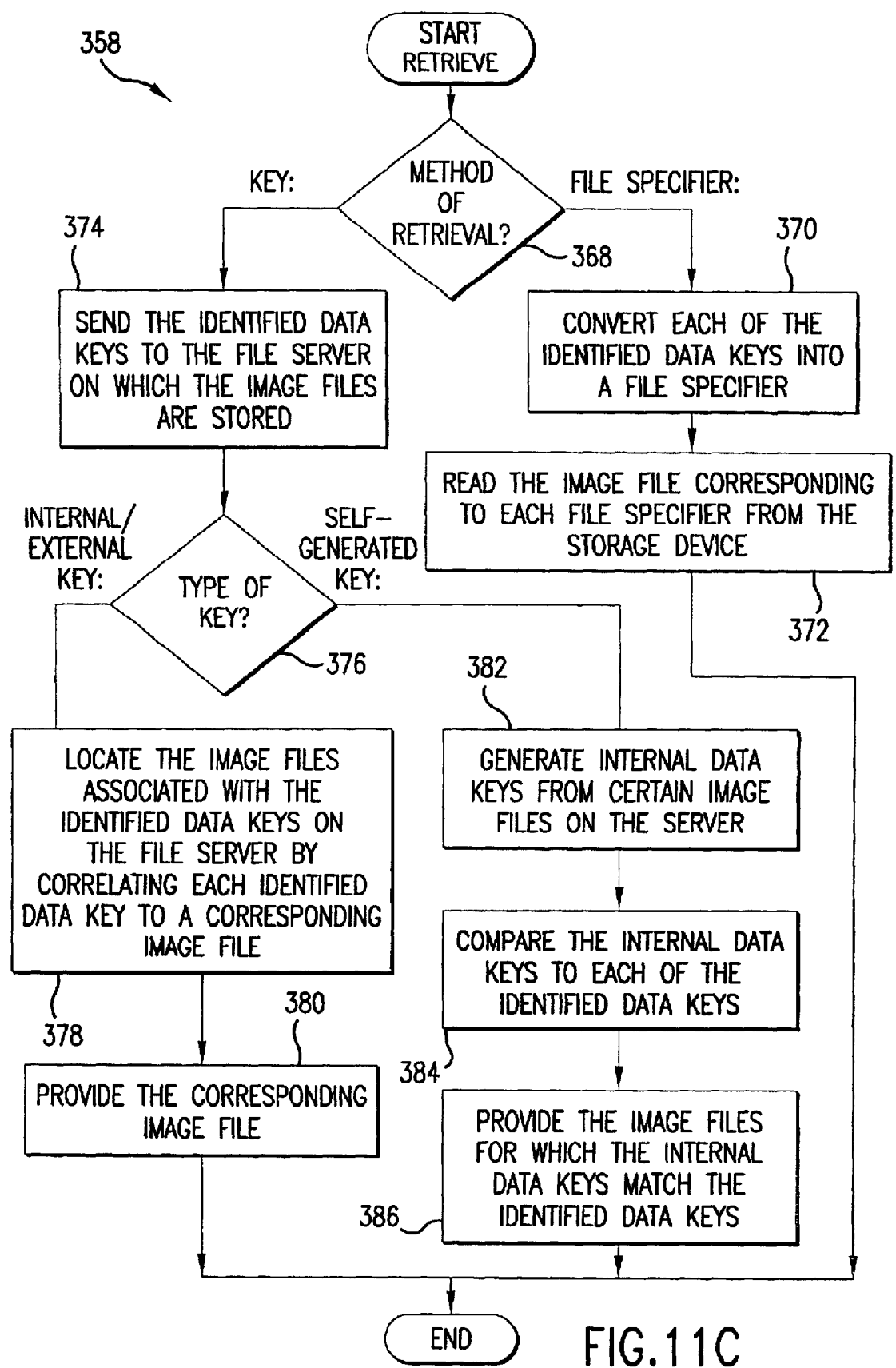

Yet another embodiment of the present invention, as best understood with reference to FIGS. 11A through 11C, is a method 350 for retrieving selected image files from a storage device. The method begins at 352 by the user marking at least one of the image selection areas 54 on the proof sheet 22. The effect of this user marking is to indicate at least one image file to be retrieved, and, in the preferred embodiment, to indicate what operation is to be performed on the image file after retrieval, such as printing the image file on the printer 14' so as to create a photographic print. At 354, the marked proof sheet 22 is optically scanned by the scanner 46 in order to determine the identity marker or markers 60', and the image selection areas 54 that were marked. At 356, the data key representations within the identity marker or markers 60' and associated with the marked image selection areas are identified and converted into the corresponding data keys 128. At 358, the image files corresponding to the marked image selection areas 54 are retrieved from the storage device using the converted data keys 128. At 360, the operations specified in the marked image selection areas 54 are performed on the corresponding ones of the retrieved image files, after which the method concludes.

Considering now in further detail, with particular reference to FIG. 11B, the identifying and converting 356, at 362 the data key representations corresponding to the marked image selection areas 54 are located within the identity marker 60'. The location is preferably done by position, according to the predetermined format of the identity marker 60'. Accordingly, the position of a data key representation within the identity marker 60' correlates it to an associated one of the image selection areas 54 on the proof sheet 22, and further correlates it with one of the thumbnail images 52 which are preferably located adjacent the corresponding one of the image selection areas 54. At 364, the printed patterns of the data key representations for the selected image files are read. At 366, the printed patterns are converted into the corresponding data keys 128, and the identifying and converting 356 concludes.

Considering now in further detail, with particular reference to FIG. 11C, the retrieving 358 the image files from the mass storage device, at 368 the method of retrieval is determined. If the method of image file retrieval is by conversion of the data key 128 into the file specifier for the desired file ("File Specifier" branch of 368), then at 370 each of the identified data keys 128 are converted into file specifiers, and at 372 the image files corresponding to each of the file specifiers are retrieved from the storage device and the retrieving 358 concludes.

If the method of image file retrieval is by comparison with the data key 128 for the desired file ("Key" branch of 368), then at 374 the identified data keys 128 for the desired image files are sent to the file server 230 on which the image files are stored. Typically the user account information is also sent to the server 230 in order to gain access to the user's portion of the file system. At 376, the type of data key 128 is determined. If, as part of the storage process, the file server 230 either embedded the data keys 128 within the corresponding image files, or stored the data keys 128 in a separate link file containing a table of the associated data key 128 and image file pairs ("Internal/External Key" branch of 376), then at 378 the file server 230 locates the image files associated with the identified data keys 128 by correlating each data key 128 with the corresponding image file. At 380, these corresponding image files are provided to the host computer 200 by the server 230, and the retrieving 358 concludes.

If, as part of the storage process, the file server 230 did not store the data keys ("Self-Generated Key" branch of 376), then at 382 the file server 230 generates internal data keys from certain image files stored on the server. At 384, the file server 230 compares these internal data keys with each of the identified data keys for the image files to be retrieved, which are provided to the server 230 by the host computer 200. At 386, the file server 230 provides to the host computer 200 those image files for which the internal data keys generated by the file server 230 match the identified data keys provided to the file server 230 by the host computer 200. Then, the retrieving 358 concludes.

Considering now another aspect of the proof sheets 22, as described heretofore the proof sheets 22 generated by a storage operation 250, or photocopies thereof, are intended to be retained in the proof sheet archive for a future time at which a retrieval operation 350 is desired by the user. If one or more proof sheets 22 are discarded, damaged, or destroyed, the host computer 200 can be used to obtain the image files from the storage device and download them to the printer 14', in an analogous manner to how the printer 14' obtains the image files from the digital camera 12 or the memory card 16 prior to storage. Once the image files are downloaded to the printer 14', a new proof sheet or sheets 22 for those images can be printed and stored in the proof sheet archive 126 for future use.

Figure 8:
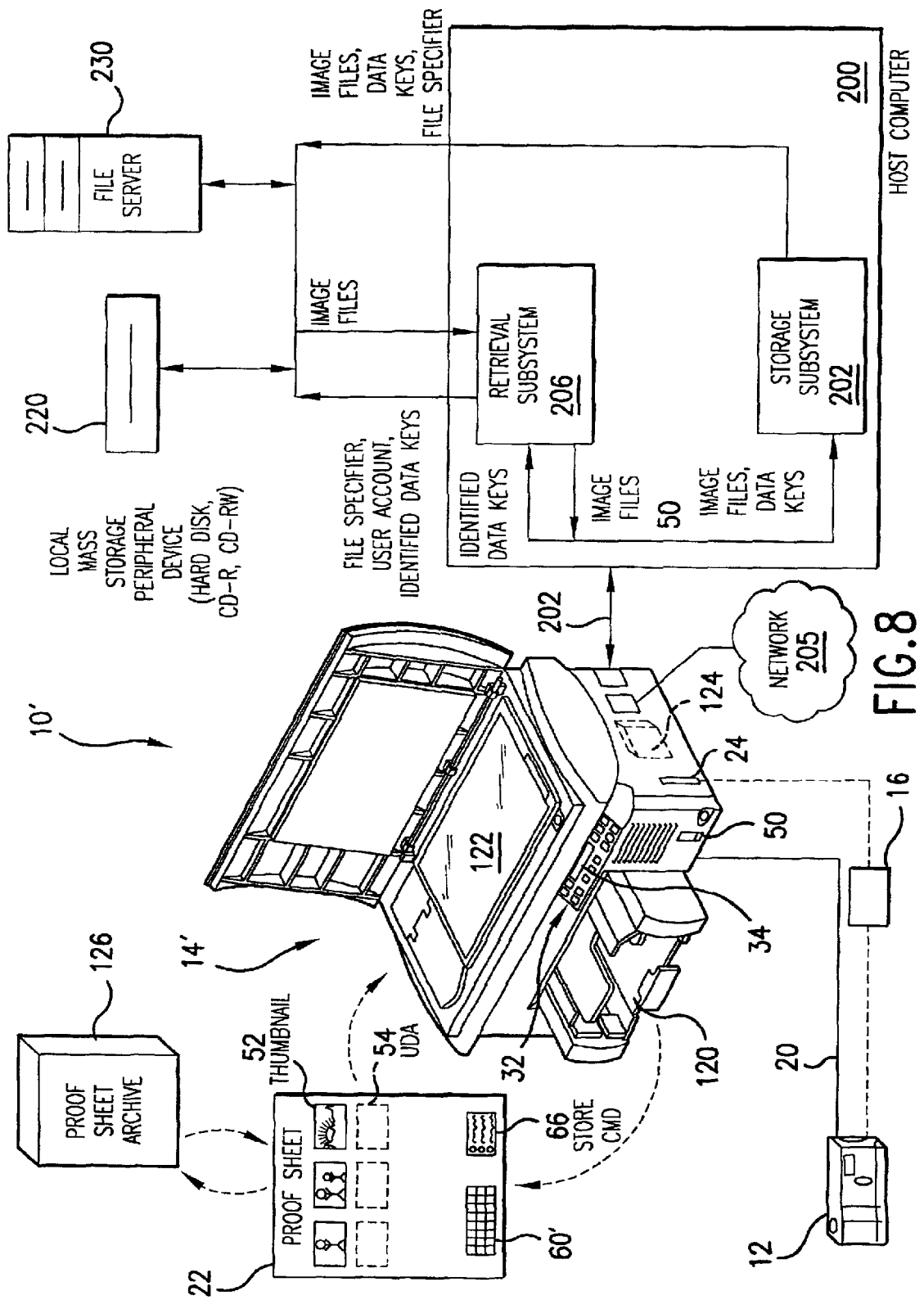
FIG. 8 is a schematic representation of an image processing system according to the present invention for printing images locally, storing and retrieving images on a mass storage device, and sending images via fax or e-mail to remote locations via a user-designated proof sheet.
Figure 13:
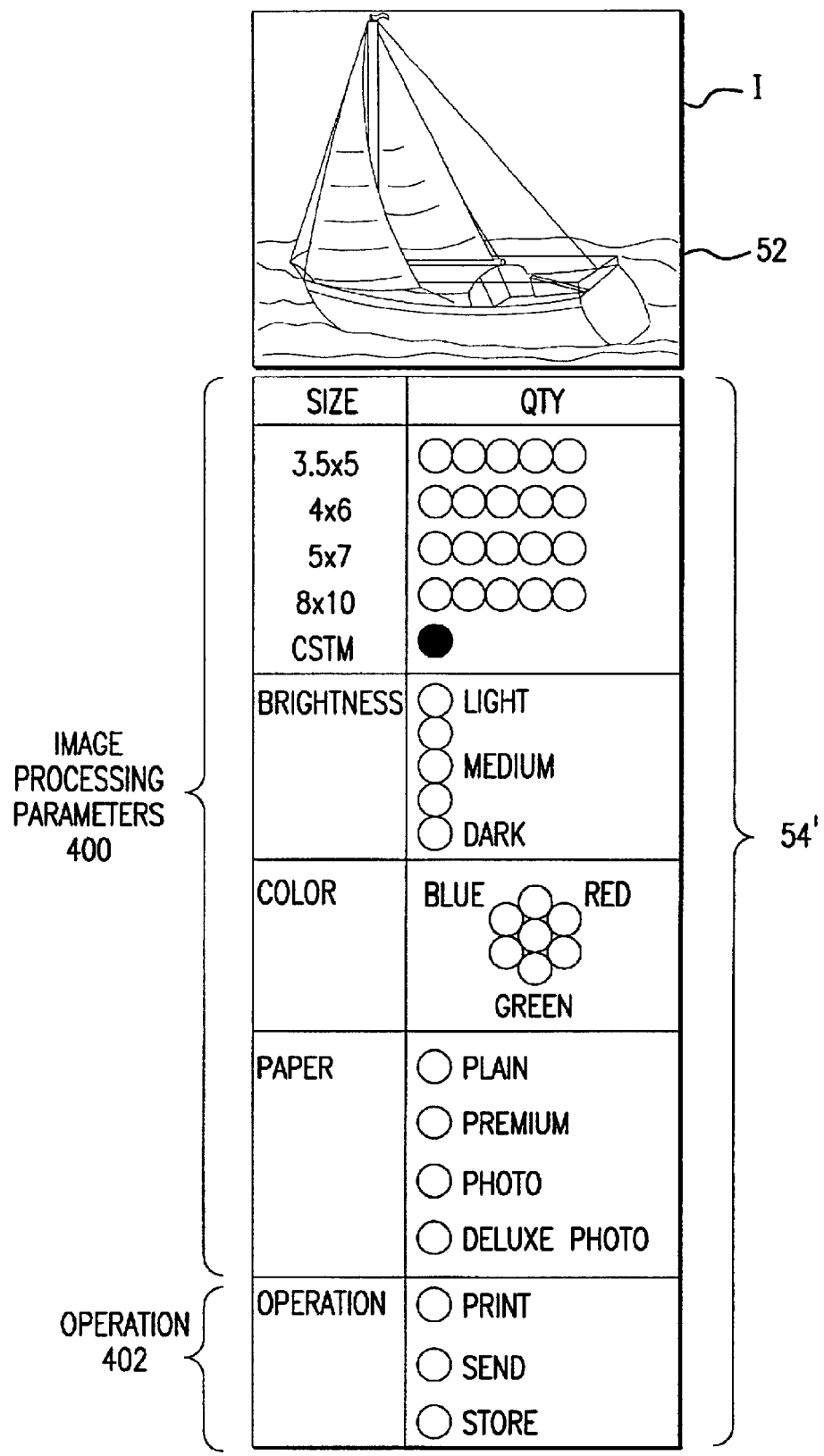
FIG. 13 is a portion of an exemplary proof sheet and order form that may be utilized with the system of FIG. 8 to specify the operational values of image processing parameters for an individual image file.

Considering now in further detail the user interface of the multifunction printer 14', and as best understood with reference to FIGS. 2, 8, and 13, the printer 14' has a CPU or processor 26 which is connected to an input port 50 for receiving digital image files from a memory card reader 24 or through a direct data link 20 to a digital camera 12. The printer 14' also has a command interface connected to the processor 26 for receiving a command to initiate a processing sequence and for specifying a first operation to be performed on the digital image files by the processor 26 during the processing sequence. The command interface may include one or more pushbuttons 32 operated by the user, a communications port 50 which is preferentially connected to a host computer 200 for receiving commands transmitted to the printer 14' over a host computer link 202, or the like. The multifunction printer 14' also includes a scanner 46 connected to the processor 26 for receiving and optically scanning a combination proof and order sheet 22. Markings made by the user in an image processing operations region 402 of the user designation areas 54' on the sheet 22 specify one or more additional image processing operations to be performed, and also indicates (by virtue of the associated thumbnail image 52) on which ones of the digital image files these additional operations will be performed by the processor 26 during the processing sequence. The processing operations 402 can include printing digital image files on the printer 14', storing digital image files on a mass storage device such as a local mass storage peripheral 220 or a file server 230, and sending digital image files to a remote location over a communications link 203 which connects to a network 205 such as the Internet (for e-mail transmissions) or the telephone system (for fax transmissions).

In performing the image processing operations, the printer 14' uses image processing parameters when performing some or all of the processing operations. As best understood with reference to FIG. 13, these parameters may include, but are not limited to the size/scaling of prints, the number of copies of prints ("Qty") to be made, the brightness adjustment to be made to the digital image, the color balance adjustment made to the digital image, the type of media on which the image is to be printed, and the like. Some of these image processing parameters (for example, the type of paper and number of copies) may apply only to a subset of the processing operations (for example, printing), while other parameters (for example, brightness and color balance) may apply to all processing operations.

Figure 12:
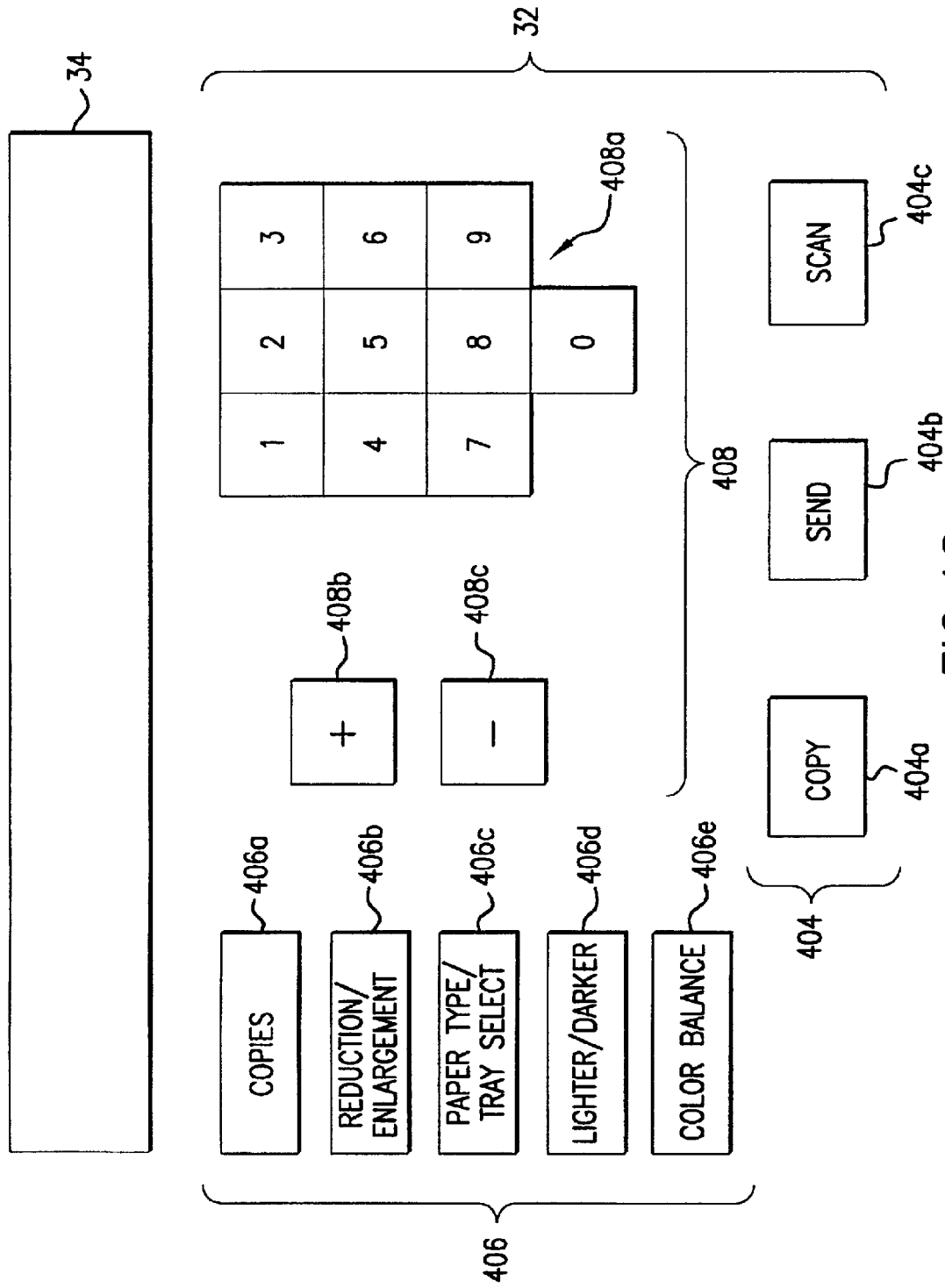
FIG. 12 is a schematic representation of an exemplary set of user controls for a multifunction printing device usable in the system of FIG. 8.

A set of default values for the image processing parameters may be provided at the command interface. For default values sent over the host computer link 202, each parameter and its value are electrically transmitted from the host computer 200 to the printer 14' according to a command set protocol (not shown). For default values entered via pushbuttons 32 on the printer 14', and as best understood with reference to the exemplary user interface of FIG. 12, a group of operation pushbuttons 404 initiates an image processing operation from the front panel, including a copy button 404*a* for initiating a print operation, a send button 404*b* for initiating a send (fax or e-mail) operation, and a scan button 404*c* for initiating a store operation. A group of parameter selection pushbuttons 406 selects an image processing parameter to be modified. The parameter selection pushbuttons 406 include a copies pushbutton 406*a* which selects the number of copies parameter, a reduction/enlargement pushbutton 406*b* which selects the print size parameter, a paper type/tray select pushbutton 406*c* which selects the paper type parameter, a lighter/darker button 406*d* which selects the brightness parameter, and a color balance parameter 406*e* which selects the color balance parameter. A group of parameter value pushbuttons 408 specify the value for the parameter previously selected by operating one of the parameter selection pushbuttons 406. A numeric keypad 408*a* may be used to directly enter a parameter value (such as a number of copies), or to enter an index of an ordered set of discrete parameter values (such as a "3" to select the "medium" brightness setting). The parameter value may be set automatically when a valid numeric value is entered, or the numeric keypad 408*a* may additionally include an enter pushbutton (not shown) to terminate value entry and set the parameter value accordingly. Alternatively, an increment pushbutton 408*b* and decrement pushbutton 408*c* may be used to scroll through a set of discrete choices of parameter values. In the preferred embodiment, prompts and results of pushbutton 32 presses are displayed on the display 34 to provide visual feedback to the user of his actions. The design and operation of the interactions between pushbutton 32 manipulations and the display 34 are preferably selected in accordance with human factors principles which are well known to those skilled in the art. It should also be noted that the number, function, and placement of pushbuttons 32 may be varied from the illustrative pushbuttons 32 of FIG. 12 without departing from the scope of the present invention. Also, the present invention also contemplates other modes of operation for setting parameters which are known to those skilled in the art; for example, a parameter selection pushbutton 406 may be pressed a number of times in order to cycle through a set of discrete parameter values.

In addition to the default parameter values, overriding values for some or all of the image processing parameters may be marked on the proof and order sheet 22 in an image processing parameter area 400. A set of overriding values applies to a subset of the image files. The subset is typically a single image file identified by a thumbnail image 52 associated with a parameter area 400. Alternatively, the subset may include all image files if the image processing parameter area 400 is part of the "All Pictures" user designation area 64 of FIG. 3B. Markings made by the user in user designation areas 54' on the sheet 22 specify the overriding parameter values. During a processing sequence, the processor 26 processes each of the image files in each individual subset using any overriding values for the parameters; if one or more parameters does not have an overriding value, the processor uses the default values.

Figure 14A:
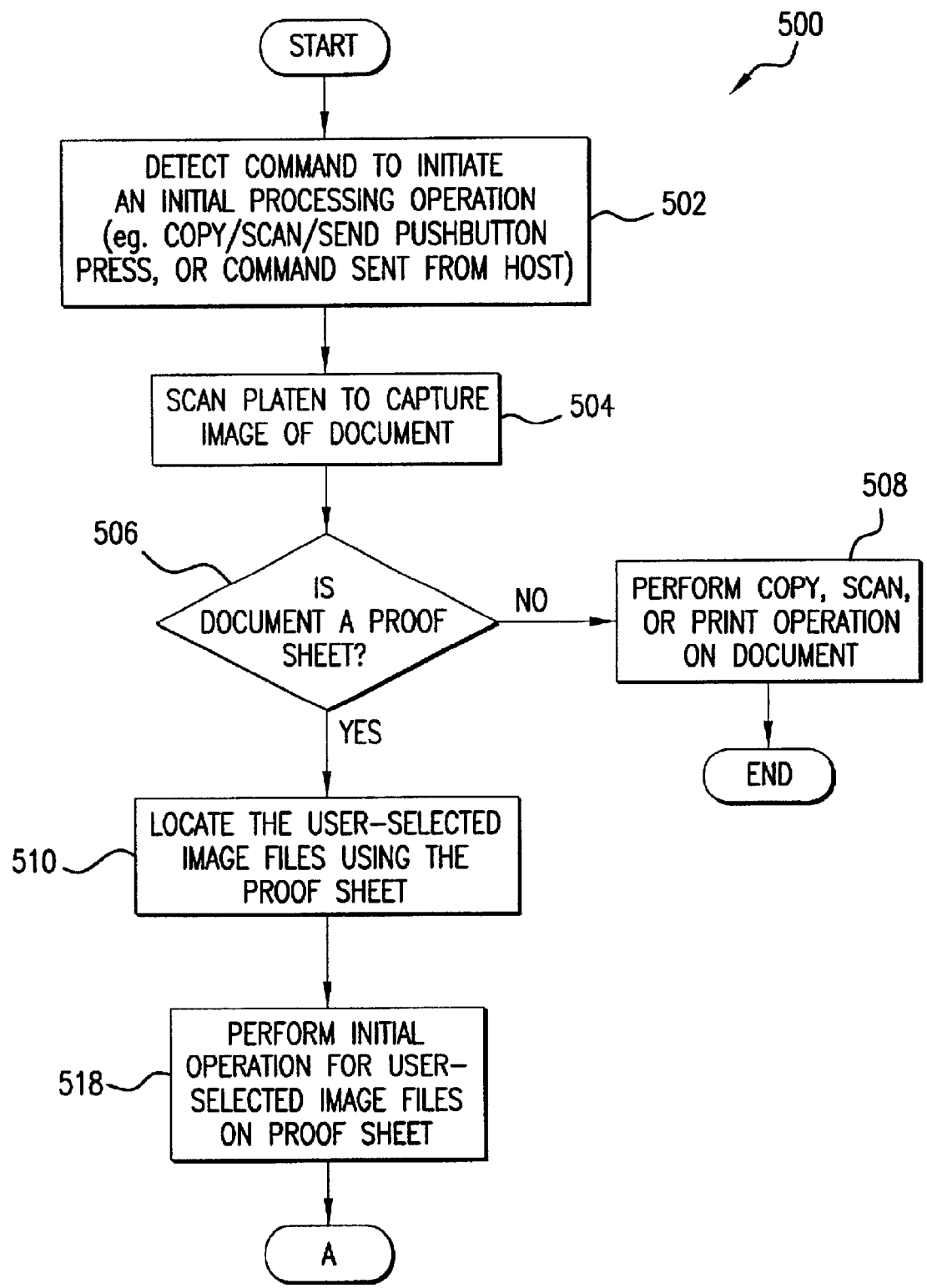
FIGS. 14A–B are top level flowcharts of a method for specifying and performing multiple image processing operations on selected ones of a set of digital image files using the system of FIG. 8 and a combination proof sheet and order form having the features illustrated by way of example in FIG. 13.
Figure 14B:
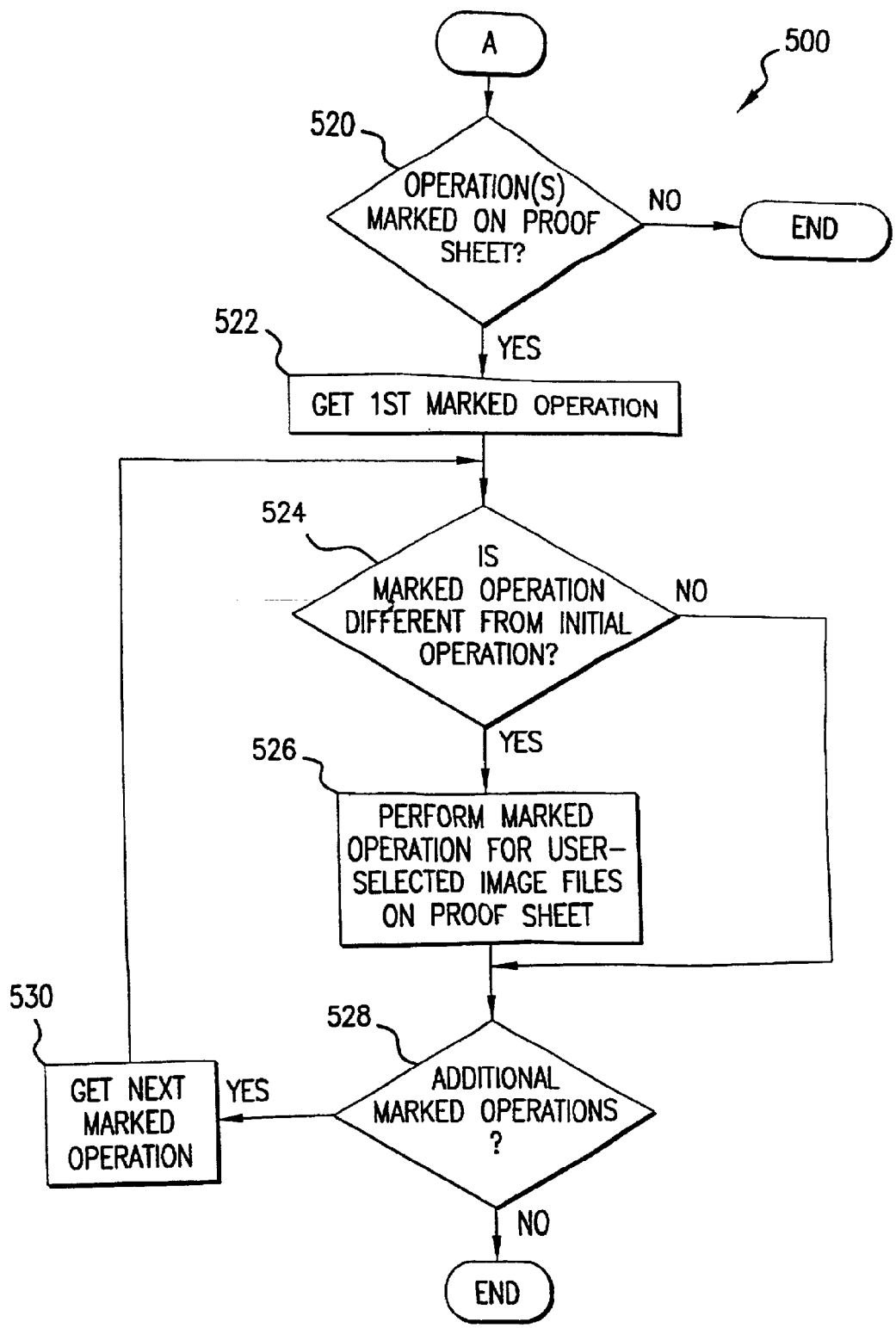

The present invention may also be implemented as a method 500 for processing image files with a multifunction printing system 10' having a scanner 46. As best understood with reference to FIGS. 14A–B, the method 500 begins at 502 by detecting a command to initiate an initial processing operation of an image processing sequence. The command may be generated by the user manipulation of a control on the printing system 10, such as a copy 404a, scan 404c, or send 404b pushbutton press; or the command may alternatively be generated by the host computer 200 and sent to the printer 14' via the host computer link 202. At 504, a document placed on the platen 122 of the scanner 46 is optically scanned to form a document image in response to the command. At 506, it is determined whether the document on the platen is a proof sheet 22. In the preferred embodiment, the scanned document image data is analyzed to detect whether control information, such as an identity marker 60' or a pattern of thumbnails 52 and user designation areas, exists on the document. In an alternate embodiment, a proof sheet pushbutton (not shown) may be provided on the printing system 10 in order to indicate that the document is a proof sheet 22. If no control information exists on the document, or if the proof sheet pushbutton is not manipulated ("No" branch of 506), then the document is not a proof sheet 22, and so at 508 the image processing operation corresponding to the command is performed on the document, and the method ends. If the control information is detected ("Yes" branch of 506), then at 510, and as will be discussed subsequently in greater detail, the user-selected image files to be processed are located using the proof sheet 22. At 518, and as will also be discussed subsequently in greater detail, the initial processing operation is performed on the user-selected image files.

After the initial processing operation has been performed, if there were no image processing operations marked by the user in any of the image processing operation regions 402 of the proof sheet 22 ("No" branch of 520), then the method ends. If there are operations marked ("Yes" branch of 520), then at 522 a first operation marked on the proof sheet 22 is identified. If this marked processing operation is different from the initial processing detected at 502 and previously performed at 518 ("Yes" branch of 524), then at 526 this marked operation is performed on all the user-selected image files for which this particular operation was marked. If there are other, different image processing operations marked by the user in any of the image processing operation regions 402 of the proof sheet 22 ("Yes" branch of 528), then at 530 the next of these marked operations is identified, and the method branches to 524. If there were no other, different image processing operations marked by the user in any of the image processing operation regions 402 of the proof sheet 22 ("No" branch of 528), then the method ends.

Figure 15:
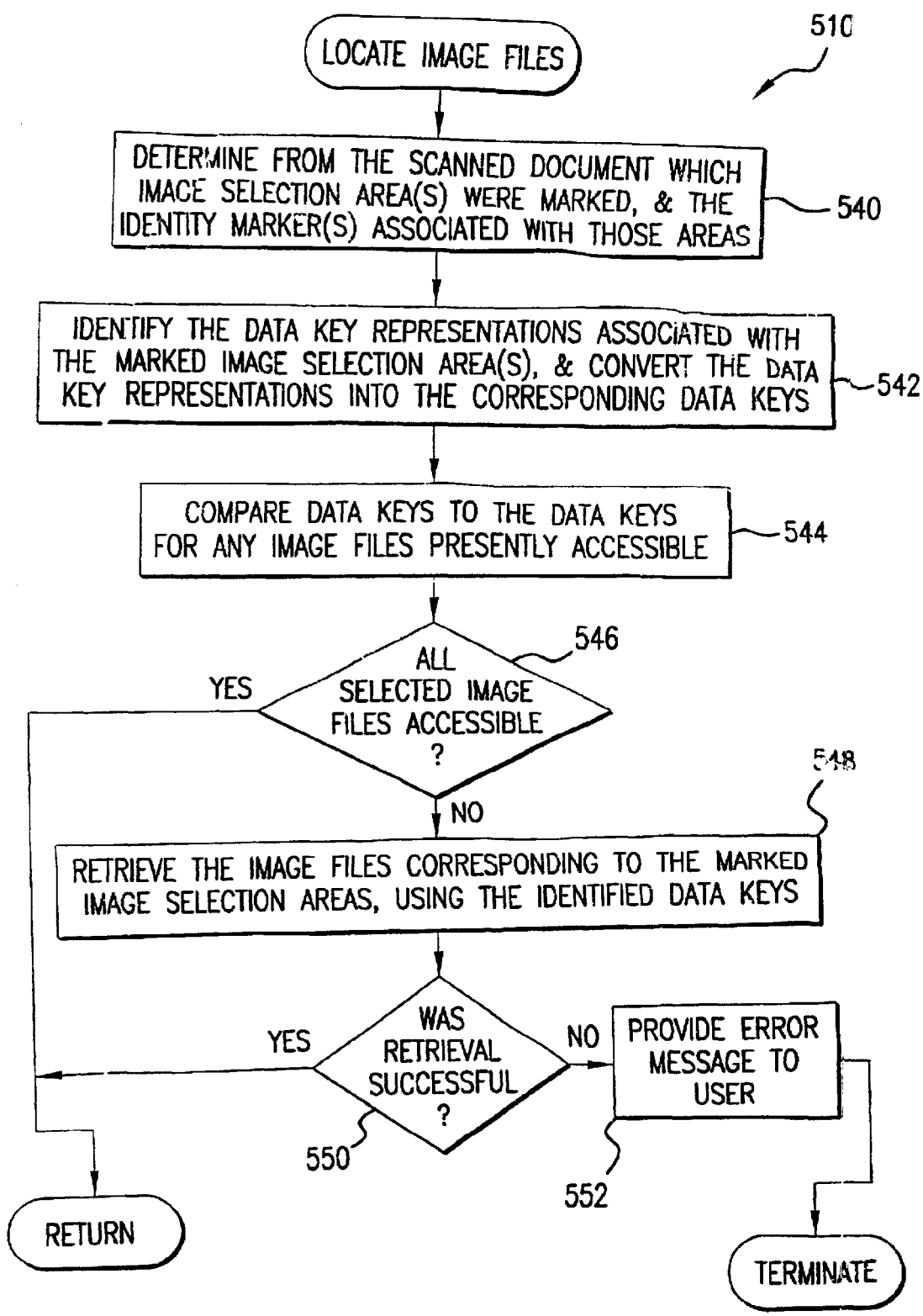
FIG. 15 is a more detailed flowchart for locating image files in accordance with the method of FIG. 14A.

Considering now in further detail a preferred embodiment of the locating 510 of the user-selected image files, and with reference to FIG. 15, at 540 the scanned document image is analyzed to determine the marked user-designation areas 54' which serve to indicate the user-selected image files, and the identity markers 60' associated with those marked user-designation areas 54'. At 542, the data key representations associated with the marked user-designation areas 54' are identified, and those data key representations are converted into their corresponding data keys, as described heretofore. At 544, the data keys are used to determine whether the corresponding user-selected image files are presently loaded into (for example, from a memory card 16) or connected to (for example, from a link 20 connected to a camera 12) the printer 14'. If all the user-selected image files are presently accessible to the printer 14' ("Yes" branch of 546), the locating 510 completes successfully. If at least some of the user-selected image files are not presently accessible to the printer 14' ("No" branch of 546), then at 548 these image files are retrieved from the mass storage device using the data keys. If retrieval of all files is successful ("Yes" branch of 550), the locating 510 completes successfully. If retrieval of any file is not successful ("No" branch of 550), then at 552 an error message is provided to the user, and the method 500 is terminated.

Figure 16:
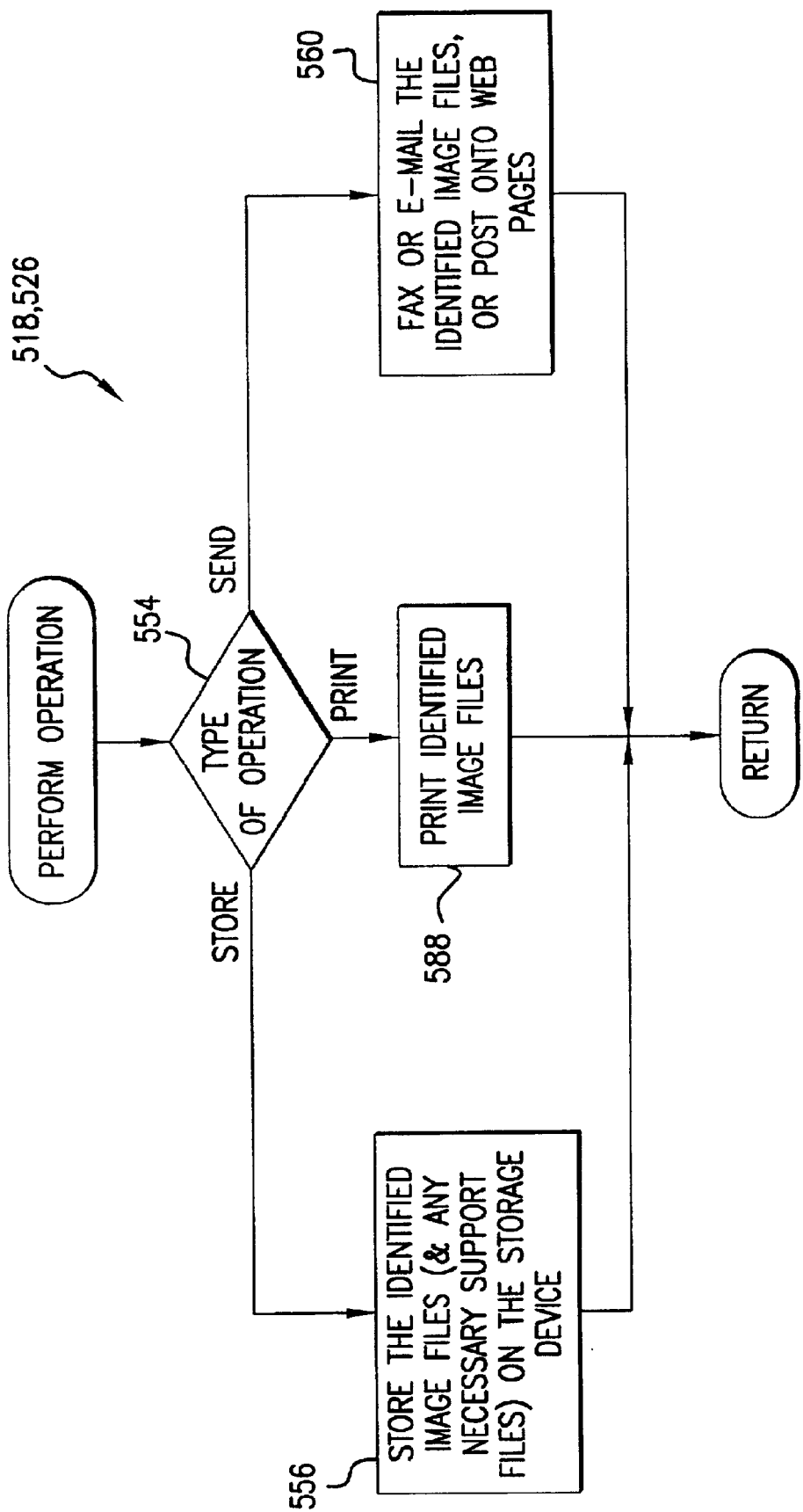
FIG. 16 is a more detailed flowchart for performing an image processing operation on image files in accordance with the method of FIG. 14A.

Considering now in further detail the performing the initial image processing operation 518 and the marked image processing operation 526 on the user-selected image files, and with reference to FIG. 16, the same method is used for both operations 518, 526. At 554, the type of image processing operation is determined. If the operation is a store operation, then at 556 the user-selected image files are stored on the mass storage device along with any necessary support files, as described heretofore. If the operation is a print operation, then at 558 the user-selected image files are printed, as will be described subsequently. If the operation is a send operation, then at 560 the user-selected image files are sent to a desired recipient system, such as faxing the image files to a fax machine, e-mailing the image files to an e-mail account, or posting the image files onto a web page.

Note that, particularly for performing the initial image processing operation at 518, alternative implementations of the present invention may utilize different standards for determining whether or not a file is user-selected. The preferred implementation identifies as user-selected any images for which any marking is made in the user designation area 54' of the proof sheet 22. Alternative implementations may identify as user-selected only those images for which a marking is made in the image processing parameter region 400 of the user designation area 54', or only those images for which a marking is made in a parameter of the image processing parameter region 400 which is applicable to the associated image processing operation to be performed—for example, the "number of copies" parameter is applicable to a print operation, but not to a store operation.

Figure 17:
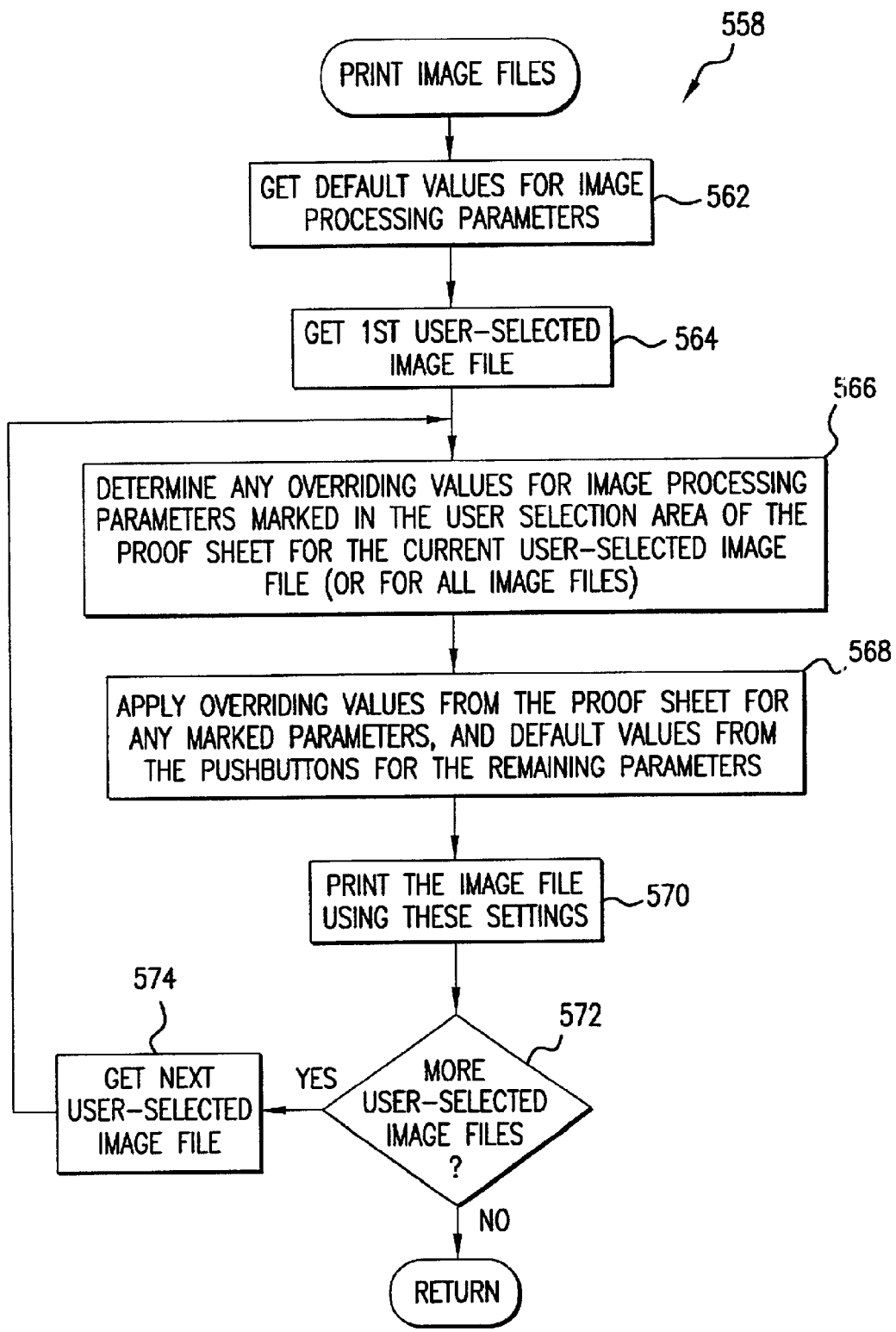
FIG. 17 is a more detailed flowchart for printing identified image files in accordance with the method of FIG. 16.

Considering now in further detail the printing 558 of the user-selected image files, and with reference to FIG. 17, at 562 the default values for the image processing parameters are obtained. These default values are obtained, as described heretofore, at the command interface, preferably by the user pressing parameter selection pushbuttons 406 and parameter value pushbuttons 408. At 564, the first user-selected image file is obtained. At 566, any overriding values that the user specified for certain ones of the image processing parameters (by marking the appropriate bubbles of the image processing parameters 400 on the proof sheet 22) are determined. Typically the markings are made in the image processing parameter region 400 associated with the thumbnail 52 of a particular file, but the user could alternatively choose to mark an "All Pictures" user designation area 64 in order to use the overriding values for all image files. At 568, the overriding values are applied to the corresponding image processing parameters, while the default values are applied to the remaining image processing parameter for which no overriding values were specified. At 570, the image file is printed using these applied parameter values. If there are more user-selected image files to be printed ("Yes" branch of 572), then at 574 the next user-selected image file is obtained, and the method branches back to 566. If there are no more user-selected image files to be printed ("No" branch of 572), the printing 558 concludes. It is apparent from the above description that the image processing parameters to which overriding values are applied can vary from user-selected image to user-selected image, and that the overriding values for a single parameter can vary from user-selected image to user-selected image. It is also apparent from the above description that if there are no overriding parameter values marked by the user for a particular user-selected image file, then that image file will be printed using the default values for all image processing parameters.

Figure 18:
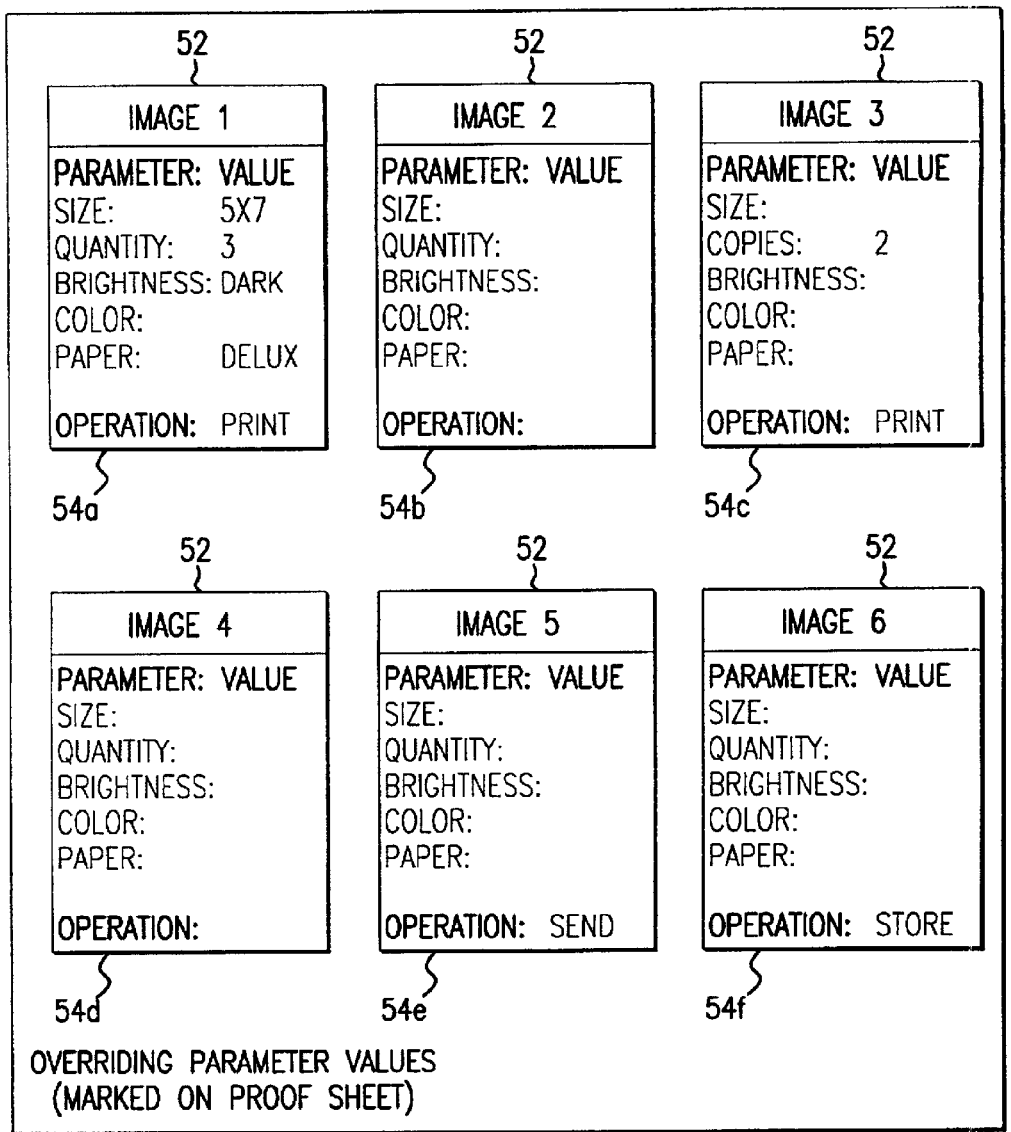
FIG. 18 is a schematic representation of an exemplary proof sheet and order form indicating user markings and which is useful for illustrating the operation of the method of FIGS. 14A–B.

FIG. 18 illustrates by way of example the operation of the novel method for processing image files according to the present invention. The example proof sheet 22 illustrates six image files, denoted Image 1 through Image 6, and uses a summary notation for noting user markings for parameters, values and operations. Since there are no markings for parameter values or operation in the user designation areas 54b,d for Images 2 and 4, then by applying the preferred implementation described above for determining whether or not a file is user-selected (namely, any marking made in the user designation area 54' designates a file as user-selected, whether it is in the image processing region 400 or the operation region 402), Images 2 and 4 are not user-selected, and thus no image processing operations will be performed on them. Overriding parameter values are indicated at 54a for Image 1, at 54c for Image 3, at 54e for Image 5, and at 54f for Image 6. Default parameter values are indicated at 580.

In this example, assume that the initial image processing operation selected at the command interface is a print operation. The print operation produce prints for the four user-selected image files using the parameters indicated in Table I:

TABLE I

Results of Exemplary Print Operation for Proof Sheet of FIG. 18

| Parameter | Image 1 | Image 3 | Image 5 | Image 6 |
|---|---|---|---|---|
| Size | 5 × 7 | 3.5 × 5 | 3.5 × 5 | 3.5 × 5 |
| Quantity | 3 | 2 | 1 | 1 |
| Brightness | Dark | Medium | Medium | Medium |
| Color Balance | Normal | Normal | Normal | Normal |
| Paper | Deluxe | Photo | Photo | Photo |

After the initial image processing operation which produces the prints is completed, the example proof sheet 22 is analyzed and the send operation for Image 5 is detected. Image 5 is the only image file which is marked for sending, and thus the send operation is performed on Image 5. The sheet 22 is then further analyzed and the store operation for Image 6 is detected. Image 6 is the only image file which is marked for storing, and thus the store operation is performed on Image 6. The image processing method is then complete.

From the foregoing it will be appreciated that the system and method for processing image files so as to allow multiple image processing operations, using differing parameters for different image files, to be specified at a single point in time represent a significant advance in the art. Although several specific embodiments of the invention have been described and illustrated, the invention is not limited to the specific methods, forms, or arrangements of parts so described and illustrated. In particular, while the invention has frequently been described with reference to "image files", image files as contemplated by the present invention are not limited to mere photographic or pictorial data, but can alternatively or additionally contain textual data. Also, the components of the multifunction printer 14', while preferably packaged into a single unit, may alternatively be packaged as separate components which are communicatively coupled to each other by wired or wireless communication links. With regard to image processing, the number and function of image processing parameters, and their alternative values, are merely exemplary; the present invention is usable in conjunction with other parameters and values known in the art. In addition, the layout and configuration of the proof sheet can be varied as desired without departing from the scope of the present invention. Furthermore, while a method for determining operational values for image processing parameters has been described with reference to parameters used for printing image files, the method is equally applicable to storing image files, sending image files, and the like. Therefore, the invention is limited only by the claims.

What is claimed is:

1. A method for processing image files, comprising:

detecting a command to perform an initial processing operation on user-selected ones of the image files;

optically scanning a document to form a document image in response to the command;

analyzing the document image to detect control information on the document;

if the control information is detected, performing the initial processing operation on the user-selected ones of the image files;

analyzing the document image to detect at least one marked processing operation marked on the document;

if the at least one marked processing operation is detected, performing the at least one marked processing operation on corresponding ones of the user-selected ones of the image files.

2. The method of claim 1, wherein the initial processing operation and the at least one marked processing operation are each selected from the group consisting of printing the image files on a medium, storing the image files on a mass storage device, and sending the image files to a compatible system of a recipient.

3. The method of claim 2, wherein the sending is selected from the group consisting of faxing, e-mailing, and posting onto a web page.

4. The method of claim 1, wherein the document is a combination proof and order sheet, further comprising:

marking a user designation area of the combination proof and order sheet so as to specify the at least one marked processing operation.

5. The method of claim 1, further comprising:

if the control information is not detected, performing the initial processing operation on the document image.

6. The method of claim 1, wherein the document is a combination proof and order sheet, and wherein the analyzing the document image to detect control information on the document includes:

analyzing the document image to detect at least one identity marker on the combination proof and order sheet.

7. The method of claim 1, wherein the detecting the command includes detecting manipulation of a control on a multifunction printing system.

8. The method of claim 1, wherein the detecting the command includes receiving a command sent to a multifunction printing system via a host computer link.

9. The method of claim 1, wherein the document is a combination proof and order sheet, further comprising:

marking at least one user designation area of the combination proof and order sheet so as to specify the user-selected ones of the image files.

10. The method of claim 9, wherein the marking includes:
marking a user designation area associated with all the image files.

11. The method of claim 9, wherein the marking includes:
marking at least one user designation area, each area associated with a corresponding one of the image files.

12. The method of claim 1, comprising:
analyzing the document image to identify the user-selected ones of the image files.

13. The method of claim 12, wherein the analyzing the document image to identify the user-selected ones and the analyzing the document image to detect the at least one marked processing operation are performed if the control information is detected.

14. The method of claim 2, wherein the initial processing operation and at least one of the marked processing operations are different.

15. The method of claim 9, wherein the marking includes:
marking at least one user designation area, each area associated with fewer than all of the image files.

16. A method for specifying operational values for image processing parameters, comprising:
identifying image files to be processed;
obtaining from a first data source default values for each of the parameters;
for at least one subset of the image files, obtaining from a second data source overriding values for selected ones of the parameters;
processing each of the image files in each individual subset using the overriding values for the selected ones of the parameters and the default values for the non-selected ones of the parameters; and
processing each of the image files excluded from all of the subsets using the default values for each of the parameters.

17. The method of claim 16, wherein each of the at least one subset of the image files contains one image file.

18. The method of claim 16, wherein the at least one subset of the image files is at least two subsets, and wherein at least one element selected from the group consisting of the selected one of the parameters and the overriding values is different in a first one and a second one of the at least two subsets.

19. The method of claim 16, wherein the obtaining default values from a first data source includes obtaining default values from user-operated controls of a multifunction printing system having a scanner.

20. The method of claim 19, wherein the obtaining overriding values from a second data source includes obtaining overriding values from user markings made on a proof sheet inserted into the scanner.

21. The method of claim 16, wherein the processing each of the image files is selected from the group consisting of printing each of the image files on a medium, storing each of the image files on a mass storage device, and sending each of the image flies to a compatible system of a recipient.

22. The method of claim 16, wherein each individual one of the parameters is selected from the group consisting of a copy-count parameter, a size/scaling parameter, a media-select parameter, a brightness parameter, and a color balance parameter.

23. A multifunction printing system, comprising:
a processor;
an input port connected to the processor for receiving image files;
an interface connected to the processor for receiving a command to initiate a processing sequence and for specifying an initial operation to be performed on the image files by the processor during the processing sequence; and
a scanner connected to the processor for receiving and optically scanning a combination proof and order sheet specifying a marked operation to be performed on selected ones of the image files by the processor during the processing sequence.

24. The multifunction printing system of claim 23, wherein the initial operation and the marked operation are each a different one selected from the group consisting of printing image files, storing image files, and sending image files.

25. The multifunction printing system of claim 23, wherein the interface is selected from the group consisting of a set of user interface controls and a communications port.

26. A multifunction printing system, comprising:
a processor;
an input port connected to the processor for receiving digital image files;
an interface connected to the processor for specifying default values for a set of image processing parameters;
a scanner connected to the processor for receiving and optically scanning a combination proof and order sheet, the sheet specifying for at least one subset of the image files overriding values for selected ones of the image processing parameters; and
wherein the processor processes each of the image files in each individual subset using the overriding values for the selected ones of the parameters and the default values for the non-selected ones of the parameters.

27. A method for processing image files, comprising:
identifying user-selected ones of a set of image files;
receiving from an interface an initial processing operation;
for at least one subset of the user-selected image files, detecting a marked processing operation from a user-marked proof sheet by optically scanning the user-marked proof sheet;
performing the initial processing operation on the user-selected image files; and
performing the marked processing operation on each of the user-selected image files in each corresponding one of the subsets.

* * * * *

UNITED STATES PATENT AND TRADEMARK OFFICE
CERTIFICATE OF CORRECTION

PATENT NO.        : 6,956,671 B2                                               Page 1 of 1
APPLICATION NO. : 09/767935
DATED             : October 18, 2005
INVENTOR(S)       : Melissa Monty et al.

It is certified that error appears in the above-identified patent and that said Letters Patent is hereby corrected as shown below:

In column 23, line 58, in Claim 21, delete "flies" and insert -- files --, therefor.

Signed and Sealed this

Twenty-first Day of July, 2009

JOHN DOLL
*Acting Director of the United States Patent and Trademark Office*